US012689592B2

(12) United States Patent
Kim et al.

(10) Patent No.: US 12,689,592 B2
(45) Date of Patent: Jul. 21, 2026

(54) ELECTRONIC DEVICE FOR DATA COMMUNICATION IN WIRELESS COMMUNICATION SYSTEM AND METHOD FOR OPERATING SAME

(71) Applicant: Samsung Electronics Co., Ltd., Suwon-si (KR)

(72) Inventors: Jinhyoung Kim, Suwon-si (KR); Wonbo Lee, Suwon-si (KR); Sungin Kim, Suwon-si (KR); Taewan Kim, Suwon-si (KR); Hongshik Kim, Suwon-si (KR); Jaewon Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 18/467,132

(22) Filed: Sep. 14, 2023

(65) Prior Publication Data

US 2024/0137325 A1      Apr. 25, 2024

Related U.S. Application Data

(63) Continuation of application No. PCT/KR2023/013582, filed on Sep. 11, 2023.

(30) Foreign Application Priority Data

Oct. 17, 2022      (KR) ........................ 10-2022-0132859
Dec. 5, 2022      (KR) ........................ 10-2022-0167945

(51) Int. Cl.
*H04L 47/283*      (2022.01)
*H04L 61/4511*      (2022.01)
(Continued)

(52) U.S. Cl.
CPC ........ *H04L 47/283* (2013.01); *H04L 61/4511* (2022.05); *H04L 61/5007* (2022.05);
(Continued)

(58) Field of Classification Search
CPC ............... H04L 47/283; H04L 61/5007; H04L 2101/604; H04L 61/00; H04L 61/4511;
(Continued)

(56) References Cited

U.S. PATENT DOCUMENTS 10,009,952 B2      6/2018   Kim
11,297,543 B2      4/2022   Lee et al.
(Continued)

FOREIGN PATENT DOCUMENTS

CN            103532841 A      1/2014
JP            2020-088472      6/2020
(Continued)

OTHER PUBLICATIONS

Search Report and Written Opinion issued Sep. 11, 2023 in counterpart International Patent Application No. PCT/KR2023/013582.
(Continued)

*Primary Examiner* — Angela Widhalm De Rodriguez
(74) *Attorney, Agent, or Firm* — NIXON & VANDERHYE P.C.

(57)      ABSTRACT

Various embodiments of the disclosure relate to a device and a method for modifying a UPF in an electronic device. The electronic device may include: a communication circuit and a processor. The processor may be configured to: perform data communication through a PDU session and IP address 1, identify IP address 2 of the PDU session related to modification of the UPF, identify an RTT in which the IP address 1 is used and an RTT in which the IP address 2 is used, in a state in which the IP address 1 and the IP address 2 of the PDU session are allocated, modify the data path to
(Continued)

IP address 2, based on a result of comparing the RTT in which IP address 1 is used and the RTT in which IP address 2 is used, prior to expiration of a valid lifetime of IP address 1, and release the IP address 1 based on modification of the data path to the IP address 2.

14 Claims, 15 Drawing Sheets

(51) Int. Cl.

| | | |
|---|---|---|
| *H04L 61/5007* | (2022.01) | |
| *H04L 61/5053* | (2022.01) | |
| *H04L 67/148* | (2022.01) | |
| *H04L 101/604* | (2022.01) | |
| *H04W 36/00* | (2009.01) | |
| *H04W 76/11* | (2018.01) | |
| *H04W 76/20* | (2018.01) | |

(52) U.S. Cl.
CPC ........ *H04L 61/5053* (2022.05); *H04L 67/148* (2013.01); *H04W 36/00* (2013.01); *H04W 76/11* (2018.02); *H04W 76/20* (2018.02); *H04L 2101/604* (2022.05)

(58) Field of Classification Search
CPC .. H04L 61/5053; H04L 67/148; H04W 36/00; H04W 76/11; H04W 76/20
See application file for complete search history.

(56) References Cited

U.S. PATENT DOCUMENTS

| | | | | |
|---|---|---|---|---|
| 12,219,005 | B2 * | 2/2025 | Dunbar | H04L 45/04 |
| 2008/0069104 | A1 * | 3/2008 | von Eicken | H04L 45/02 370/392 |
| 2017/0366618 | A1 * | 12/2017 | Vrzic | H04L 67/148 |
| 2018/0167298 | A1 * | 6/2018 | He | H04L 61/4511 |
| 2018/0270715 | A1 | 9/2018 | Lee et al. | |
| 2018/0279180 | A1 | 9/2018 | Lee et al. | |
| 2020/0336947 | A1 | 10/2020 | Lee et al. | |
| 2020/0382605 | A1 | 12/2020 | Ouyang et al. | |
| 2020/0389531 | A1 * | 12/2020 | Lee | H04L 67/52 |
| 2021/0368373 | A1 | 11/2021 | Youn et al. | |
| 2022/0007444 | A1 | 1/2022 | Kawasaki et al. | |
| 2022/0166724 | A1 | 5/2022 | Morin et al. | |
| 2022/0191763 | A1 | 6/2022 | Roeland et al. | |
| 2022/0225211 | A1 * | 7/2022 | Yu | H04W 28/0268 |
| 2022/0338113 | A1 | 10/2022 | Gupta et al. | |
| 2023/0188965 | A1 | 6/2023 | Yao et al. | |

FOREIGN PATENT DOCUMENTS

| | | |
|---|---|---|
| KR | 10-2018-0088248 | 8/2018 |
| KR | 10-2021-0099386 | 8/2021 |
| KR | 10-2021-0102134 | 8/2021 |
| KR | 10-2289879 | 8/2021 |
| KR | 10-2021-0135962 | 11/2021 |
| KR | 10-2449017 | 9/2022 |
| WO | 2018174503 A1 | 9/2018 |
| WO | 2021066498 A1 | 4/2021 |
| WO | 2022/032547 | 2/2022 |
| WO | 2022099229 A1 | 5/2022 |

OTHER PUBLICATIONS

3GPP; TSG SA; "Procedures for the 5G System (5GS); Stage 2 (Release 17)", 3GPP TS 23.502 V17.6.0, Sep. 22, 2022.

Extended European Search Report dated Oct. 15, 2025 issued in European Patent Application No. 23880025.4, 12 pp.

3rd Generation Partnership Project; Technical Specification Group Services and System Aspects; Procedures for the 5G System (5GS); Stage 2 (Release 17), 3GPP Draft; 23502-H00_FROM_G80_CRS_IMPLEMENTED_SWAP_4.15.4.3-4.15.4.4_MOVE5.2.6.22-23, 3rd Generation Partnership Project (3GPP), Mobile Competence Centre ; 650, Route Des Lucioles ; F-06921 Sophia-An, Mar. 30, 2021 (Mar. 30, 2021), XP051991195, Retrieved from the Internet: URL:https://ftp.3gpp.org/.

* cited by examiner

ELECTRONIC DEVICE FOR DATA COMMUNICATION IN WIRELESS COMMUNICATION SYSTEM AND METHOD FOR OPERATING SAME

CROSS-REFERENCE TO RELATED APPLICATIONS

This application is a continuation of International Application No. PCT/KR2023/013582 designating the United States, filed on Sep. 11, 2023, in the Korean Intellectual Property Receiving Office and claiming priority to Korean Patent Application Nos. 10-2022-0132859, filed on Oct. 17, 2022, and 10-2022-0167945, filed on Dec. 5, 2023, in the Korean Intellectual Property Office, the disclosures of each of which are incorporated by reference herein in their entireties.

BACKGROUND

Field

The disclosure relates to a device and a method for data communication in a wireless communication system.

Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post long term evolution (post LTE)" system. The 5G communication system is considered to be implemented in 6 GHz or lower bands (e.g., about 1.8 GHz bands or about 3.5 GHz bands) or relatively higher frequency bands (e.g., about 28 GHz bands or about 39 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

A core network of a 5G communication system may provide a session and service continuity (SSC) mode in order to support various requirements regarding continuity of an application program or a service (or a function) of an electronic device. The core network may apply the SSC mode with regard to each protocol data unit (PDU) session. The SSC mode may include three modes. For example, SSC mode 1 may include a mode in which a UPF (for example, an anchor UPF) for communication with an external data network (DN) is not relocated while a PDU session with the electronic device is maintained. For example, SSC mode 2 may refer to a mode in which relocation of a UPF (for example, an anchor UPF) for communication with an external DN is allowed such that, during UPF relocation, connection to the existing UPF is broken, and connection to a new UPF is configured (break-before-make type). For example, SSC mode 3 may refer to a mode in which relocation of a UPF (for example, an anchor UPF) for communication with an external DN is allowed such that, during UPF relocation, connection to the existing UPF is maintained while configuring connection to a new UPF is configured (make-before-break type).

When using SSC mode 3, an electronic device in a 5G communication system may be able to transmit data simultaneously through multiple UPFs. While connection to the existing UPF and a new UPF remains configured, the electronic device may need a scheme for controlling connection to existing UPF and the new UPF.

SUMMARY

Various embodiments of the disclosure provide a device and a method for satisfying the quality of experience (QoE) of data communication related to an application program in an electronic device configured in SSC mode 3.

According to various example embodiments, an electronic device may include: a communication circuit and a processor operatively connected to the communication circuit. According to an example embodiment, the processor may be configured to perform data communication through a protocol data unit (PDU) session and Internet protocol (IP) address 1. According to an example embodiment, the processor may be configured to identify IP address 2 of the PDU session related to modification of a data path. According to an example embodiment, the processor may be configured to identify a round trip time (RTT) in which the IP address 1 is used and an RTT in which the IP address 2 is used, in a state in which the IP address 1 and the IP address 2 of the PDU session are allocated. According to an example embodiment, the processor may be configured to modify the data path to IP address 2, based on a result of comparing the RTT in which IP address 1 is used and the RTT in which IP address 2 is used, prior to expiration of a valid lifetime of IP address 1. According to an example embodiment, the processor may release IP address 1 based on modification of the data path to IP address 2.

According to various example embodiments, a method of operating an electronic device may include performing data communication through a PDU session and IP address 1. According to an example embodiment, the method of operating an electronic device may include identifying IP address 2 of the PDU session related to modification of a data path. According to an example embodiment, the method of operating an electronic device may include identifying an RTT in which IP address 1 is used and an RTT in which IP address 2 is used, in a state in which IP address 1 and IP address 2 of the PDU session are allocated. According to an example embodiment, the method of operating an electronic device may include modifying the data path to IP address 2, based on a result of comparing the RTT in which IP address 1 is used and the RTT in which IP address 2 is used, prior to expiration of a valid lifetime of IP address 1. According to an example embodiment, the method of operating an electronic device may include releasing IP address 1 based on modification of the data path to IP address 2.

According to various example embodiments, a non-transitory computer-readable storage medium (or a computer program product) storing one or more programs may be disclosed. According to an example embodiment, the one or more programs may include instructions which, when executed by a processor of an electronic device, cause the electronic device to perform operations including: performing data communication through a PDU session and IP address 1, identifying IP address 2 of the PDU session related to modification of a UPF, identifying an RTT in which the IP address 1 is used and an RTT in which the IP address 2 is used, in a state in which the IP address 1 and the IP address 2 of the PDU session are allocated, modifying the data path to the IP address 2, based on a result of comparing the RTT in which the IP address 1 is used and the RTT in which the IP address 2 is used, prior to expiration of a valid lifetime of the IP address 1, and an operation of releasing the IP address 1 based on modification of the data path to the IP address 2.

According to various example embodiments of the disclosure, in a state in which connection to the existing user plane function (UPF) and a new UPF is configured with regard to a protocol data unit (PDU) session configured in session and service continuity (SSC) mode 3 in an electronic device, a timepoint to switch to the new UPF and/or a timepoint to disconnect from the existing UPF are configured, based on the quality of experience (QoE) (for example, round trip time (RTT), path loss, and/or throughput) related to the existing UPF and the new UPF, thereby providing the user with improved QoE.

Advantageous effects obtainable from various embodiments of the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 10 is a signal flow diagram illustrating an example of modifying a data path using multi-homing in an electronic device according to various embodiments;

FIG. 14 is a signal flow diagram illustrating an example for modifying a data path using single-homing in an electronic device according to various embodiments.

DETAILED DESCRIPTION

Hereinafter, various example embodiments will be described in greater detail with reference to the accompanying drawings.

Figure 1:
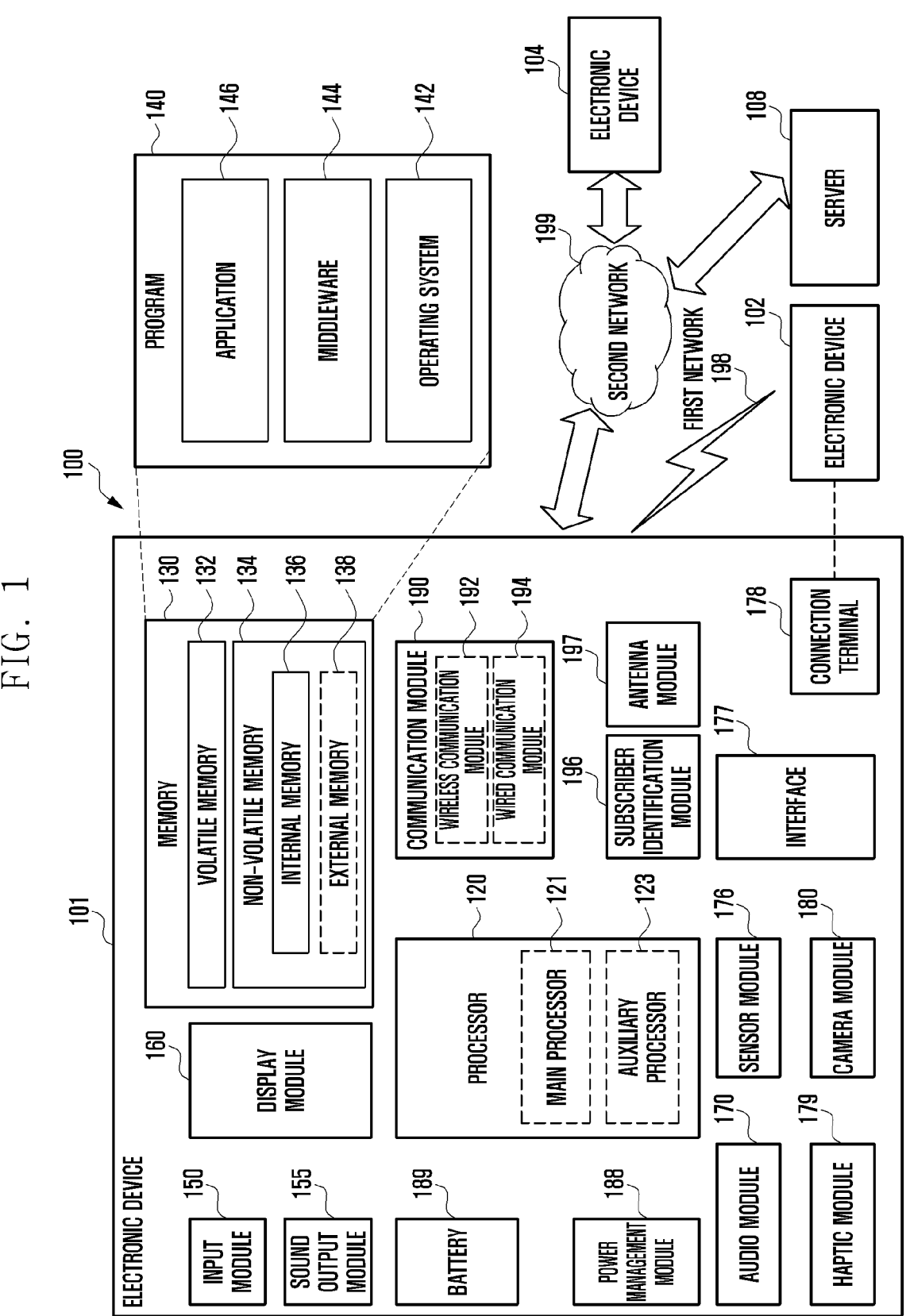
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
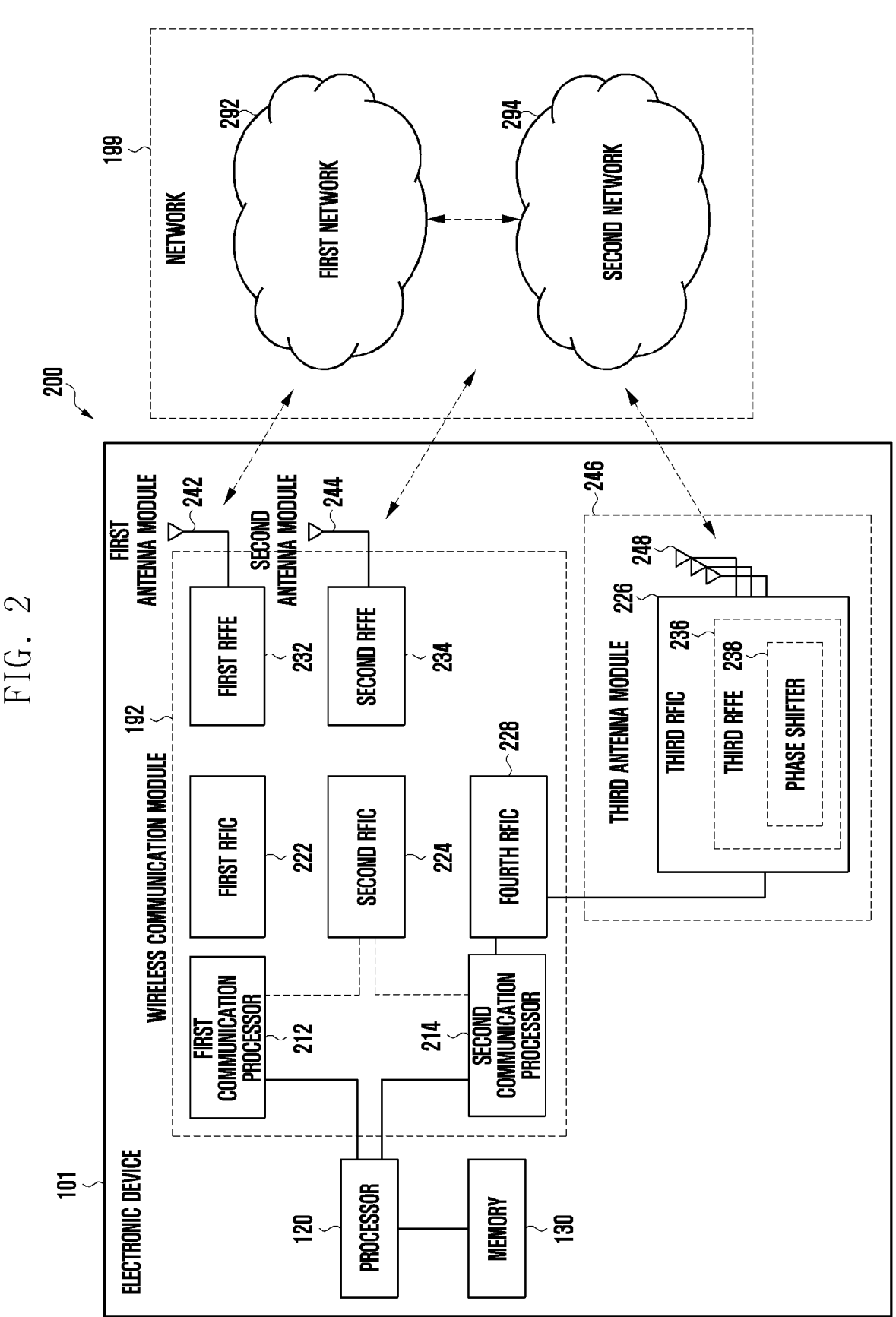
FIG. 2 is a block diagram illustrating an example configuration of an electronic device for supporting legacy network communication and 5G network communication according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the auxiliary processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in apart (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
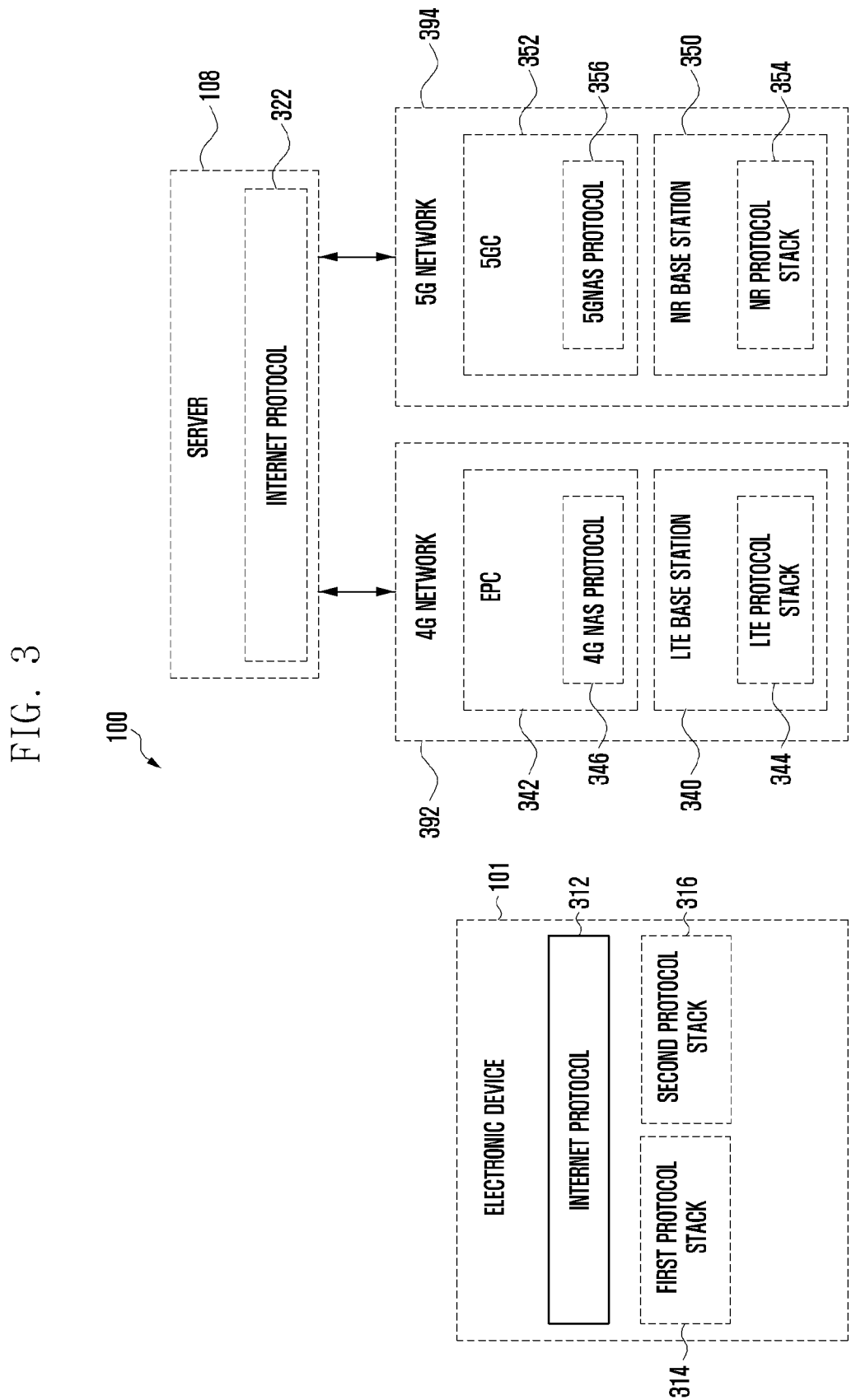
FIG. 3 is a diagram illustrating a protocol stack structure of a network for 4G communication and/or 5G communication according to various embodiments.

FIG. 3 is a diagram illustrating a protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394. According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device According to an embodiment, the electronic device 101 may perform wireless communication with the 4G network 392 using the first communication protocol stack 314.

According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission and/or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a 4G NAS (non-access stratum) protocol 346. The 4G network 392 may perform LTE wireless communication with the electronic device 101 using the LTE communication protocol stack 344 and the 4G NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol and the user plane protocol may include physical (PHY), medium access control (MAC), radio link control (RLC), or packet data convergence protocol (PDCP) layers. For example, the PHY layer may channel-code and modulate data received from an upper layer (for example, MAC layer) and transmit the same through a wireless channel, and may demodulate and decode data received through the wireless channel and transfer the same to the upper layer. The PHY layer included in the second protocol stack 316 and the NR protocol stack 354 may further perform an operation related to beamforming. For example, the MAC layer may logically/physically map data to a wireless channel to transmit/receive the same, and may perform a hybrid automatic repeat request (HARQ) for error correction. For example, the RLC layer may perform data concatenation, segmentation, or reassembly, and may perform data order identification, rearrangement, or duplicate check. For example, the PDCP layer may perform operations related to ciphering of control data and user data and data integrity. The second protocol stack 316 and the NR protocol stack 354 may further include a service data adaptation protocol (SDAP). For example, the SDAP may manage radio bearer allocation based on the quality of service (QoS) of user data.

According to various embodiments, the control plane protocol may include a radio resource control (RRC) layer and a non-access stratum (NAS) layer. For example, the RRC layer may process control data related to radio bearer configuration, paging, or mobility management. For example, the NAS may process control messages related to authentication, registration, and mobility management.

Figure 4:
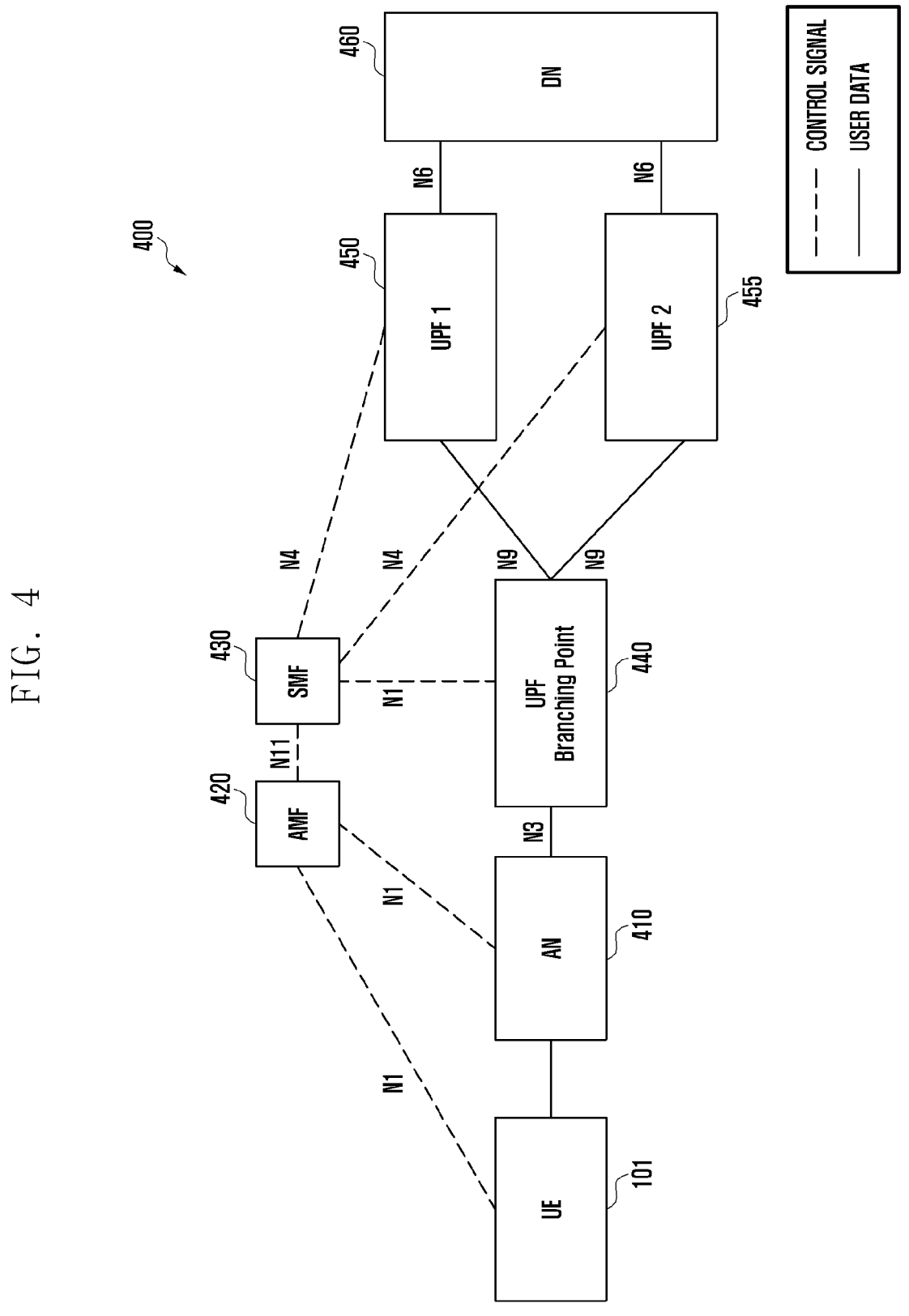
FIG. 4 is a diagram illustrating the structure of a 5G network according to various embodiments.

FIG. 4 is a diagram illustrating an example structure of a 5G network according to various embodiments.

According to various embodiments referring to FIG. 4, the 5G network 400 may include multiple network functions (NFs) 410 to 460. However, the 5G network 400 is not limited to the example in FIG. 4, and may include a larger or smaller number of NFs than illustrated in FIG. 4.

According to various embodiments, the (radio) access network (R)AN 410 is an entity configured to allocate radio resources of an electronic device 101, and may be at least one of an eNode B, a Node B, a base station (BS), a next generation radio access network (NG-RAN), a 5G-access network (AN), a wireless access unit, a base station controller, or a node on a network. For example, the electronic device 101 may include user equipment (UE), next generation (NG) UE, a mobile station (MS), a cellular phone, a smartphone, a computer, or a multimedia system capable of performing a communication function. Although the disclosure will be described with reference to a network (for example, 5G network) of a 5G communication system as an example, the disclosure is also applicable to other communication systems having similar technical backgrounds. In addition, the disclosure is applicable to other communication systems through a partial modification deemed not to substantially deviate from the scope of the disclosure by a person skilled in the art.

According to various embodiments, the access and mobility management function (AMF) 420 may be a network function configured to manage the mobility of the electronic device 101.

According to various embodiments, the session management function (SMF) 430 may be a network function configured to manage a protocol data unit (PDU) session (or packet data network (PDN) connection) provided to the electronic device According to various embodiments, the user plane function (UPF) 450 and/or 455 may be a function configured to play the role of gateway for transferring user data (for example, PDU) to the data network (DN) 460.

According to various embodiments, the UPF branching point (BP) 440 may be a function configured to connect a PDU session of the electronic device 101 and the UPF 450 or 455. According to an embodiment, the UPF BP 440 may connect a PDU session of the electronic device 101 to the UPF 1 450 or UPF 2 455.

According to various embodiments, the data network (DN) 460 may be a data network through which the electronic device 101 transmits and/or receives data in order to use the network operator's service or a 3 rd party service.

Figure 5:
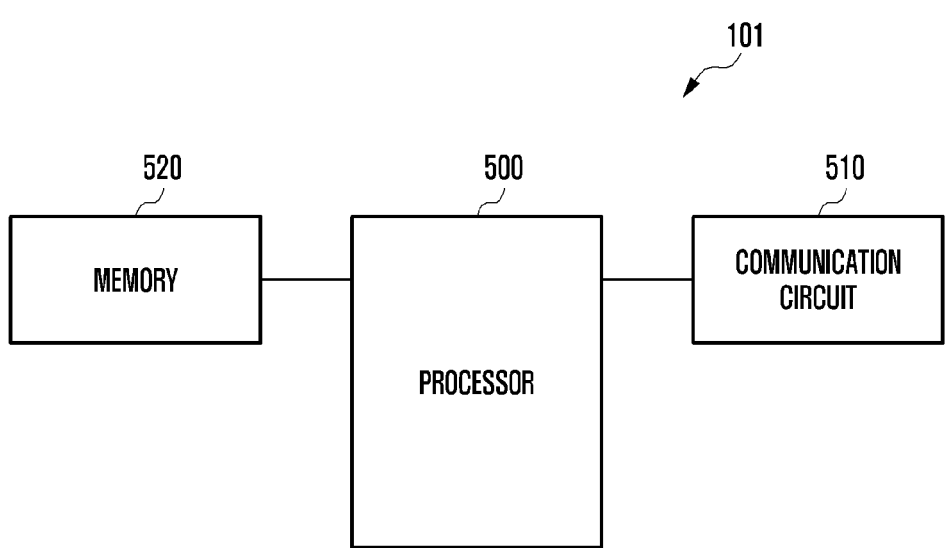
FIG. 5 is a block diagram illustrating an example configuration of an electronic device configured to provide data communication according to various embodiments.

FIG. 5 is a block diagram illustrating an example configuration of an electronic device configured to provide data communication according to various embodiments. According to an embodiment, the electronic device 101 in FIG. 5 may be at least partially similar to the electronic device 101 in FIG. 1, FIG. 2, FIG. 3, or FIG. 4, or may further include various embodiments of the electronic device.

Referring to FIG. 5, according to various embodiments, the electronic device 101 may include a processor (e.g., including processing circuitry) 500, a communication circuit 510, and/or a memory 520. According to an embodiment, the processor 500 may be substantially identical to the processor 120 in FIG. 1 or may be included in the processor 120. The communication circuit 510 may be substantially identical to the wireless communication module 192 in FIG. 1 or may be included in the wireless communication module 192. The memory 520 may be substantially identical to the memory 130 in FIG. 1 or may be included in the memory 130. According to an embodiment, the processor 500 may be connected to the communication circuit 510 and/or the memory 520 operatively, functionally, and/or electrically.

According to various embodiments, the processor 500 may include various processing circuitry and control the communication circuit 510 so as to establish a protocol data unit (PDU) session for data communication. According to an embodiment, the processor 500 may control the communication circuit 510 so as to transmit a messaged related to a request for access to a server (or a content server) to a network (for example, the RAN 410 in FIG. 4), based on the occurrence of an event related to data communication. As an example, the message related to a request for access may include at least one of PDU session identification information (for example, PDU session ID) or information (for example, SSC mode 3) related to a session and service continuity (SSC) mode. According to an embodiment, the processor 500 may control the communication circuit 510 so as to establish a PDU session for data communication, based on control information received from the network in response to transmission of the message related to a request for access. For example, the processor 500 may determine that establishment of a PDU session configured in SSC mode 3 is completed, based on information related to SSC mode 3 included in information (for example, PDU session establishment accept) related to PDU establishment acceptance received from the network. As an example, control information received from the network may include information related to PDU establishment acceptance, PDU session identification information, information related to at least one of SSC mode or IP address 1 (or IP prefix 1). As an example, the event related to data communication may occur based on at least one of execution of an application program related to data communication, execution of a function, user input reception, or communication signal reception.

According to various embodiments, the processor 500 may control the communication circuit 510 so as to perform data communication based on a PDU session and IP address 1. As an example, IP address 1 may include an IP address for accessing UPF 1 through the PDU session.

According to various embodiments, the processor 500 may identify relocation of a UPF related to a PDU session. According to an embodiment, the processor 500 may determine that the UPF has been relocated, based on receiving information related to IP address 1 (or IP prefix 1) having a preferred lifetime configured as a first value (for example, "0") and information related to IP address 2 (or IP prefix 2) from the network through the communication circuit 510, in the case of multi-homing. The processor 500 may generate new IP address 2 of the PDU session based on information related to IP address 2 (or IP prefix 2) received from the network. As an example, IP prefix 1 may be information (for example, network ID) configured by the network so as to include IP address 1 for access to UPF 1, and may include IP address 1 together with host identification information (for example, host ID). As an example, IP prefix 2 may be information (for example, network ID) configured by the network so as to include IP address 2 for access to UPF 2, based on a UPF relocation, and may include IP address 2 together with host identification information (for example, host ID). As an example, multi-homing may include a communication scheme in a case in which the network interface of the electronic device 101 belongs to multiple networks and thus include multiple IP addresses.

According to an embodiment, the processor 500 may receive information related to PDU session modification (for example, PDU session modification command) from the network through the communication circuit 510 in the case of single-homing. The processor 500 may control the communication circuit 510 so as to transmit a response message (for example, PDU session modification complete) regarding the information related to PDU session modification to the network. The processor 500 may control the communication circuit 510 so as transmit information (for example, PDU session modification request) related to a request for PDU session modification to the network in order to establish a new PDU session. The processor 500 may determine that establishment of PDU session 2 configured in SSC mode 3 is complete, based on an ACK regarding the information related to a request for PDU session modification received from the network. As an example, the information related to PDU session modification may include information related to the valid lifetime of IP address 1 (or IP prefix 1) of PDU session 1 (for example, PDU session before modification), PDU session 2, or IP address 2 (or IP prefix 2) of PDU session 1 (for example, new PDU session). As an example, the information related to a request for PDU session modification may include identification information of PDU session 2 which is to be newly established based on UPF modification. As an example, single-homing may include a communication scheme in a case in which the network interface of the electronic device 101 belongs to one network and thus includes one IP address.

According to various embodiments, the processor 500 may identify the quality of experience (QoE) when communication (for example, data communication) is performed using IP address 1 and/or IP address 2 of a PDU session, assuming that IP address 1 and IP address 2 of a PDU session have been allocated for UPF modification in SSC mode 3 in the case of multi-homing. As an example, the QoE may include at least one of a round trip time (RTT), path loss, or throughput. As an example, the RTT may include an RTT between an application program currently driven in the electronic device 101 (or the processor 500) and a server related to the application program (for example, end-to-end RTT).

According to an embodiment, the processor 500 may detect (or measure) the RTT in a case in which IP address 1 and/or IP address 2 are used, based on a foreground application program among application programs executed in the electronic device 101. For example, the processor 500 may detect (or measure) the RTT in a case in which IP address 1 and/or IP address 2 are used with regard to a server related to the foreground application program. As an example, the RTT in a case in which IP address 1 is used may include an RTT between a foreground application program accessed (or connected) using IP address 1 and a server related to the application program (for example, end-to-end RTT). As an example, the RTT in a case in which IP address 2 is used may include an RTT between a foreground application program accessed (or connected) using IP address 2 and a server related to the application program (for example, end-to-end RTT). As an example, the foreground application program may indicate a reference application program having a graphic user interface (GUI) displayed at the top end of the display (not illustrated) of the electronic device 101 among application programs executed in the electronic device 101.

According to an embodiment, the processor 500 may detect (or measure) the RTT in a case in which IP address 1 and/or IP address 2 are used, based on application programs executed in the electronic device 101. For example, the processor 500 may detect (or measure) the average of RTTs in a case in which IP address 1 and/or IP address 2 regarding servers related to respective application programs executed in the electronic device 101 are used. As an example, application programs executed in the electronic device 101 may include an application program having an open (or activated) socket for transmitting and/or receiving messages of the application program.

According to an embodiment, the RTT in a case in which IP address 1 and/or IP address 2 are used may include a time elapsed from a timepoint at which a transmission control protocol (TCP) synchronization signal is transmitted to a server related to an application program, based on IP address 1 or IP address 2, through the application program to a timepoint at which an ACK of the TCP synchronization signal is received from the server. According to an embodiment, the RTT in a case in which IP address 1 and/or IP address 2 are used may include a time elapsed from a timepoint at which an initial packet related to quick UDP Internet connections (QUIC) is transmitted to a server related to an application program, based on IP address 1 or IP address 2, through the application program to a timepoint at which an ACK of the initial packet is received. According to an embodiment, the RTT in a case in which IP address 1 and/or IP address 2 are used may include a time elapsed from a timepoint at which a ping request signal of Internet control message protocol (ICMP) is transmitted to a timepoint at which a ping ACK is received. According to an embodiment, the RTT in a case in which IP address 1 and/or IP address 2 are used may be determined as a combination of at least one of an RTT based on a TCP synchronization signal, an RTT based on an initial packet related to QUIC, or an RTT based on a ping request signal. As an example, the ping request signal may be a command defined in ICMP and may be used by the electronic device 101 to identify a state of connection to the network.

According to an embodiment, the processor 500 may detect (or measure) the RTT in a case in which IP address 1 is used through a server related to an application program executed in the electronic device 101. The processor 500 may identify a server (or the IP address of the server) related to an application program to be accessed through IP address 2 through pre-resolving of a domain name system (DNS) based on allocation of IP address 2 (or IP prefix 2). The processor 500 may detect (or measure) the RTT in a case in which IP address 2 is used through a server related to an application program to be accessed through IP address 2. As an example, the server related to an application program to be accessed through IP address 2 may be identical to or different from the server related to an application program to be accessed through IP address 1.

According to various embodiments, in the case of multi-homing, the processor 500 may switch the data path to IP address 2 based on the QoE in a case in which communication is performed using IP address 1 and/or IP address 2. According to an embodiment, the processor 500 may switch the data path to IP address 2 based on an RTT in a case in which IP address 2 is used and an RTT in a case in which IP address 1 is used while the valid lifetime of IP address 1 exists. For example, the processor 500 may switch the data path (or routing) to IP address 2 of a PDU session if the difference between an RRT in a case in which IP address 2 is used and an RRT in a case in which IP address 1 is used is equal to/less than a first designated reference value. For example, the processor 500 may maintain the data path (or routing) of IP address 1 of the PDU session if the difference between an RRT in a case in which IP address 2 is used and an RRT in a case in which IP address 1 is used exceeds the first designated reference value. If the data path of IP address 1 of the PDU session is maintained while the valid lifetime of IP address 1 exists, the processor 500 may identify and compare RTTs in cases in which IP address 1 and IP address 2 is used, respectively, based on a designated period, thereby identifying whether it is possible to switch the data path to IP address 2 of the PDU session. For example, if the number of times it is identified whether the data path is switched while the valid lifetime of IP address 1 exists exceeds a designated number of times, the processor 500 may switch the data path to IP address 2 of the PDU session. For example, if the valid lifetime of IP address 1 expires, the processor 500 may switch the data path to IP address 2 of the PDU session. As an example, expiration of the valid lifetime of IP address 1 may include a state in which the valid lifetime of IP address 1 is equal to/less than a designated minimum valid lifetime. For example, if transmission and reception of data based on IP address 1 of the PDU session do not exist during a designated first reference time while the valid lifetime of IP address 1 exists, the processor 500 may switch the data path to IP address 2 of the PDU session. As an example, the designated first reference time may refer to a reference time configured to determine whether to use the data path of IP address 1 in a state in which the valid lifetime of IP address 1 exists. As an example, the state in which the valid lifetime of IP address 1 exists may include a state prior to expiration of the valid lifetime of IP address 1. According to an embodiment, the processor 500 may switch the data path to IP address 2 of the PDU session, based on packet loss in a case in which IP address 1 is used while the valid lifetime of IP address 1 exists, and designated reference loss. For example, if pack loss in a case in which IP address 1 is used exceeds the designated reference loss, the processor 500 may switch the data path to IP address 2 of the PDU session. For example, if pack loss in a case in which IP address 1 is used is equal to/less than the designated reference loss, the processor 500 may maintain the data path of IP address 1 of the PDU session. If the data path of IP address 1 of the PDU session is maintained while the valid lifetime of IP address 1 exists, the processor 500 may identify packet loss in a case in which IP address 1 is used, based on a designated period, thereby identifying whether it is possible to switch the data path to IP address 2 of the PDU session. For example, if the number of times it is identified whether the data path is switched while the valid lifetime of IP address 1 exists exceeds a designated number of times, the processor 500 may switch the data path to IP address 2 of the PDU session. For example, if the valid lifetime of IP address 1 exists for a first reference time or less, the processor 500 may switch the data path to IP address 2 of the PDU session. For example, if transmission and reception of data based on IP address 1 of the PDU session do not exist during a designated second reference time while the valid lifetime of IP address 1 exists, the processor 500 may switch the data path to IP address 2 of the PDU session. As an example, packet loss in a case in which IP address 1 is used may be measured based on the TCP.

According to an embodiment, the processor 500 may update the valid lifetime of IP address 1, based on switching of the data path to IP address 2. For example, the processor 500 may reduce the valid lifetime of IP address 1 with reference to a designated interval. As an example, the designated interval may include half the valid lifetime (for example, remaining valid lifetime) of IP address 1 or a fixed interval, as a reference range for reducing the valid lifetime (for example, remaining valid lifetime) of IP address 1 at once. If the valid lifetime of IP address 1 exists, the processor 500 may repeatedly update the valid lifetime of IP address 1.

According to an embodiment, if the valid lifetime of IP address 1 has expired, the processor 500 may release IP address 1. For example, the processor 500 may close the socket of the application program related to IP address 1.

According to an embodiment, an operation in which the processor 500 switches the data path to IP address 2 may include a routing switching operation in which the routing table value of the processor 500 is modified based on IP address 2. For example, upon receiving allocation of IP address 1 of a PDU session from a network, the processor 500 may identify the address of a router (or gateway) for accessing an external data network. The processor 500 may configure (or update) the routing table, based on the router address, as in Table 1 below. As an example, if allocation of IP address 1 received from the network is "2002::1234/64", "64" may indicate IP prefix 1, "2002::/64" may indicate network identification information (for example, network ID), "::1234" may indicate host identification information (for example, host ID), and "2002::1" may indicate the router (or gateway) address. As an example, the metric in Table 1 below is an arbitrary value, and the larger the metric value, the higher the priority may be.

TABLE 1

| Destination address | Router | Metric |
| --- | --- | --- |
| ::0 | 2002::1 | 1000 |
| 2002::/64 | — | 2000 |

For example, upon receiving allocation of IP address 2 (for example, 1900::1234/64) of a PDU session from a network, the processor 500 may configure (or update) the routing table as in Table 2 below.

TABLE 2

| Destination address | Router | Metric |
| --- | --- | --- |
| ::0 | 2002::1 | 1000 |
| ::0 | 1900::1 | 500 |
| 2002::/64 | — | 2000 |
| 1900::/64 | — | 1500 |

For example, the processor 500 may configure (or update) the routing table, based on switching of the data path to IP address 2, as in Table 3 below.

TABLE 3

| Destination address | Router | Metric |
| --- | --- | --- |
| ::0 | 2002::1 | 500 |
| ::0 | 1900::1 | 1000 |
| 2002::/64 | — | 1500 |
| 1900::/64 | — | 2000 |

For example, the processor 500 may configure (or update) the routing table, based on releasing of IP address 1, as in Table 4 below.

TABLE 4

| Destination address | Router | Metric |
| --- | --- | --- |
| ::0 | 1900::1 | 1000 |
| 1900::/64 | — | 2000 |

According to various embodiments, in the case of single-homing, and if IP address 1 of PDU session 1 and IP address 2 of PDU session 2 have been allocated for UPF relocation in SSC mode 3, the processor 500 may identify the QoE in a case in which communication is performed using PDU session 1 and/or PDU session 2. As an example, the QoE may include at least one of an RTT, path loss, or throughput. According to an embodiment, the processor 500 may detect (or measure) the RTT in a case in which a server is accessed using PDU session 1 and/or PDU session 2, based on a foreground application program among application programs executed in the electronic device 101. For example, the processor 500 may detect (or measure) the RTT in a case in which a server related to the foreground application program is accessed using PDU session 1 and/or PDU session 2.

According to an embodiment, the processor 500 may detect (or measure) the RTT in a case in which PDU session 1 and/or PDU session 2 are used, based on application programs executed in the electronic device 101. For example, the processor 500 may detect (or measure) the average of RTTs in a case in which a server related to each of application programs executed in the electronic device 101 is accessed using PDU session 1 and/or PDU session 2.

According to an embodiment, the RTT in a case in which communication is performed using PDU session 1 and/or PDU session 2 may include a time elapsed from a timepoint at which a TCP synchronization signal is transmitted to a server related to an application program, based on IP address 1 or IP address 2, to a timepoint at which an ACK of the TCP synchronization signal is received from the server. According to an embodiment, the RTT in a case in which communication is performed using PDU session 1 and/or PDU session 2 may include a period of time from a timepoint at which an initial packet related to QUIC is transmitted to a server related to an application program, based on IP address 1 or IP address 2, to a timepoint at which an ACK of the initial packet is received. According to an embodiment, the RTT in a case in which IP address 1 and/or IP address 2 are used may include a period of time from a timepoint at which an ICMP ping request signal is transmitted to a timepoint at which a ping ACK is received. According to an embodiment, the RTT in a case in which communication is performed using PDU session 1 and/or PDU session 2 may be determined as a combination of at least one of an RTT based on a TCP synchronization signal, an RTT based on an initial packet related to QUIC, or an RTT based on a ping request signal.

According to an embodiment, the processor 500 may detect (or measure) the RTT in a case in which PDU session 1 is used to access a server related to an application program executed in the electronic device 101. The processor 500 may identify a server (or the IP address of the server) related to an application program to be accessed through IP address 2 through DNS pre-resolving based on allocation of IP address 2 (or IP prefix 2) of PDU session 2. The processor 500 may detect (or measure) the RTT in a case in which PDU session 2 is used to access a server related to an application program to be accessed through IP address 2. As an example, the server related to an application program to be accessed through IP address 2 may be identical to or different from the server related to an application program to be accessed through IP address 1.

According to various embodiments, in the case of single-homing, the processor 500 may switch the data path to PDU session 2, based on the QoE in a case in which communication is performed using PDU session 1 and/or PDU session 2. According to an embodiment, the processor 500 may switch the data path to PDU session 2, based on the RTT in a case in which communication is performed using PDU session 2 while the valid lifetime of PDU session 1 exists, and the RTT in a case in which communication is performed using PDU session 1. For example, the processor 500 may switch the data path to PDU session 2 if the difference between the RTT in a case in which communication is performed using PDU session 2 and the RTT in a case in which communication is performed using PDU session 1 is equal to/less than a first reference value. For example, the processor 500 may maintain the data path to PDU session 1 if the difference between the RTT in a case in which communication is performed using PDU session 2 and the RTT in a case in which communication is performed using PDU session 1 exceeds first reference value. If the data path is maintained to PDU session 1 while the valid lifetime of PDU session 1 exists, the processor 500 may identify and compare RTTs in cases in which communication is performed using PDU session 1 and PDU session 2, respectively, based on a designated period, thereby identifying whether the data path can be switched to PDU session 2. For example, if the number of times it is identified whether the data path is switched while the valid lifetime of PDU session 1 exists exceeds a designated number of times, the processor 500 may switch the data path to PDU session 2. For example, the processor 500 may switch the data path to PDU session 2 if the valid lifetime of PDU session 1 expires. As an example, expiration of the valid lifetime of IP address 1 may include a state in which the valid lifetime of IP address 1 is equal to/less than a designated minimum valid lifetime. For example, if transmission and reception of data based on IP address 1 of the PDU session do not exist during a designated first reference time while the valid lifetime of IP address 1 exists, the processor 500 may switch the data path to PDU session 2. As an example, the state in which the valid lifetime of PDU session 1 exists may include a state prior to expiration of the valid lifetime of PDU session 1.

According to an embodiment, the processor 500 may switch the data path to PDU session 2, based on packet loss in a case in which communication is performed using PDU session 1 while the valid lifetime of PDU session 1 exists, and designated reference loss. For example, the processor 500 may switch the data path to PDU session 2 if the packet loss in a case in which communication is performed using PDU session 1 exceeds the designated reference loss. For example, the processor 500 may maintain the data path to PDU session 1 if the packet loss in a case in which communication is performed using PDU session 1 is equal to/less than the designated reference loss. If the data path is maintained to PDU session 1 while the valid lifetime of PDU session 1 exists, the processor 500 may identify packet in a case in which communication is performed using PDU session 1, based on a designated period, thereby identifying whether it is possible to switch the data path to IP address 2 of PDU session 2. For example, if the number of times it is identified whether the data path is switched while the valid lifetime of IP address 1 exists exceeds a designated number of times, the processor 500 may switch the data path to PDU session 2. For example, if the valid lifetime of IP address 1 expires, the processor 500 may switch the data path to PDU session 2. For example, if transmission and reception of data based on IP address 1 of the PDU session do not exist during a designated second reference time while the valid lifetime of IP address 1 exists, the processor 500 may switch the data path to PDU session 2. As an example, packet loss in a case in which communication is performed using PDU session 1 is used may be measured based on the TCP.

According to an embodiment, the processor 500 may update the valid lifetime of IP address 1, based on switching of the data path to IP address 2 of PDU session 2. For example, the processor 500 may reduce the valid lifetime of IP address 1 with reference to a designated interval. As an example, the designated interval may include half the valid lifetime (for example, remaining valid lifetime) of IP address 1 or a fixed interval, as a reference range for reducing the valid lifetime (for example, remaining valid lifetime) of IP address 1. If the valid lifetime of IP address 1 exists, the processor 500 may repeatedly update the valid lifetime of IP address 1.

According to an embodiment, if the valid lifetime of IP address 1 has expired, the processor 500 may release IP address 1 of PDU session 1. For example, the processor 500 may close the socket of the application program related to IP address 1.

According to various embodiments, if no valid lifetime of IP address 1 of a PDU session is configured in the case of multi-homing, the processor 500 may selectively use the data path of IP address 1 or IP address 2, based on the QoE in a case in which communication is performed using IP address 1 and/or IP address 2. According to an embodiment, the processor 500 may identify a state in which no valid lifetime of IP address 1 of a PDU session is configured, through a protocol configuration option (PCO) message received from a network. According to an embodiment, if the valid lifetime of IP address 1 of a PDU session received from the network has a designated value (for example, "4"), the processor 500 may determine that no valid lifetime of IP address 1 of the PDU session is configured.

According to an embodiment, the processor 500 may select the data path of IP address 1 or IP address 2, based on the RTT in a case in which IP address 2 is used and the RTT in a case in which IP address 1 is used. For example, the processor 500 may use the data path of IP address 2 if the difference between the RTT in a case in which IP address 2 is used and the RTT in a case in which IP address 1 is used is equal to/less than a designated first reference value. For example, the processor 500 may use the data path of IP address 1 if the difference between the RTT in a case in which IP address 2 is used and the RTT in a case in which IP address 1 of the PDU session exceeds the first reference value.

According to an embodiment, the processor 500 may select the data path of IP address 1 or IP address 2, based on packet loss in a case in which an IP address (for example, IP address 1 or IP address 2) used as a data path is used, and designated reference loss. For example, the processor 500 may use the data path of IP address 2 of a PDU session if the packet loss in a case in which IP address 1 used as a data path is used exceeds the designated reference loss. For example, the processor 500 may use the data path of IP address 1 of the PDU session if the packet loss in a case in which IP address 1 used as a data path is used is equal to/less than the designated reference loss.

According to an embodiment, assuming that the valid lifetime of a specific IP address (or IP prefix) (for example, IP address 1 or IP address 2) is configured to be a first value (for example, "0") in a router advertisement (RA) message received from a network in a state in which IP address 1 and IP address 2 of a PDU session are allocated, and that the valid lifetime is configured to be a second value different from the first value, the processor 500 may use the data path of another IP address (for example, IP address 2 or IP address 1) different from the specific IP address (for example, IP address 1 or IP address 2). The specific IP address (for example, IP address 1 or IP address 2) may be released based on expiration of the valid lifetime.

According to various embodiments, if no valid lifetime of IP address 1 of a PDU session is configured in the case of single-homing, the processor 500 may use the data path of IP address 1 or IP address 2, based on the QoE in a case in which communication is performed using IP address 1 and/or IP address 2. According to an embodiment, the processor 500 may identify a state in which no valid lifetime of IP address 1 of PDU session 2 is configured, through a PCO message received from a network. According to an embodiment, if the valid lifetime of IP address 1 of PDU session 2 received from the network has a designated value (for example, "4"), the processor 500 may determine that no valid lifetime of IP address 1 of PDU session 1 is configured.

According to an embodiment, the processor 500 may select PDU session 1 or PDU session 2 as a data path, based on the RTT in a case in which communication is performed using PDU session 2 and the RTT in a case in which communication is performed using PDU session 1. For example, the processor 500 may use PDU session 2 as a data path if the difference between the RTT in a case in which communication is performed using PDU session 2 and the RTT in a case in which communication is performed using PDU session 1 is equal to/less than a designated first reference value. For example, the processor 500 may use PDU session 1 as a data path if the difference between the RTT in a case in which communication is performed using PDU session 2 and the RTT in a case in which communication is performed using PDU session 1 exceeds the first reference value.

According to an embodiment, the processor 500 may select PDU session 1 or PDU session 2 as a data path, based on packet loss in a case in which communication is performed using a PDU session (for example, PDU session 1 or PDU session 2) used as a data path, and designated reference loss. For example, the processor 500 may use PDU session 2 as a data path if the packet loss in a case in which communication is performed using PDU session 1 used as a data path exceeds the designated reference loss. For example, the processor 500 may use PDU session 1 as a data path if the packet loss in a case in which communication is performed using PDU session 1 used as a data path is equal to/less than the designated reference loss.

According to an embodiment, assuming that the valid lifetime of a specific PDU session (for example, PDU session 1) is configured to be a third value in a PCO message received from a network in a state in which PDU session 1 and PDU session 2 are established, the processor 500 may use the data path of another PDU session (for example, PDU session 2) different from the specific PDU session (for example, PDU session 1). The specific PDU session (for example, PDU session 1) may be released based on expiration of the valid lifetime.

According to various embodiments, the communication circuit 510 may support transmission and/or reception of signals and/or data with at least one external electronic device (for example, the electronic device 102 or 104 or the server 108 in FIG. 1). For example, the communication circuit 510 may include a radio frequency integrated circuit (RFIC) and/or a radio frequency front end (RFFE) for wireless communication with at least one external electronic device. As an example, the wireless communication may include a 5$^{th}$ generation communication scheme (for example, NR communication scheme) but is not limited thereto.

According to various embodiments, the memory 520 may store various pieces of data used by at least one component (for example, the processor 500 and/or the communication circuit 510) of the electronic device 101. According to an embodiment, the memory 520 may store various instructions which may be executed through the processor 500.

According to various embodiments, the electronic device 101 may switch or select a data path through the communication circuit 510 (for example, a modem). According to an embodiment, the communication circuit 510 may switch or select a data path, based on indication information from the processor 500. For example, in the case of multi-homing, the communication circuit 510 may switch the data path to IP address 2 based on the QoE in a case in which communication is performed using IP address 1 and/or IP address 2. For example, in the case of single-homing, the communication circuit 510 may switch the data path to PDU session 2 based on the QoE in a case in which communication is performed using PDU session 1 and/or PDU session 2.

Figure 6:
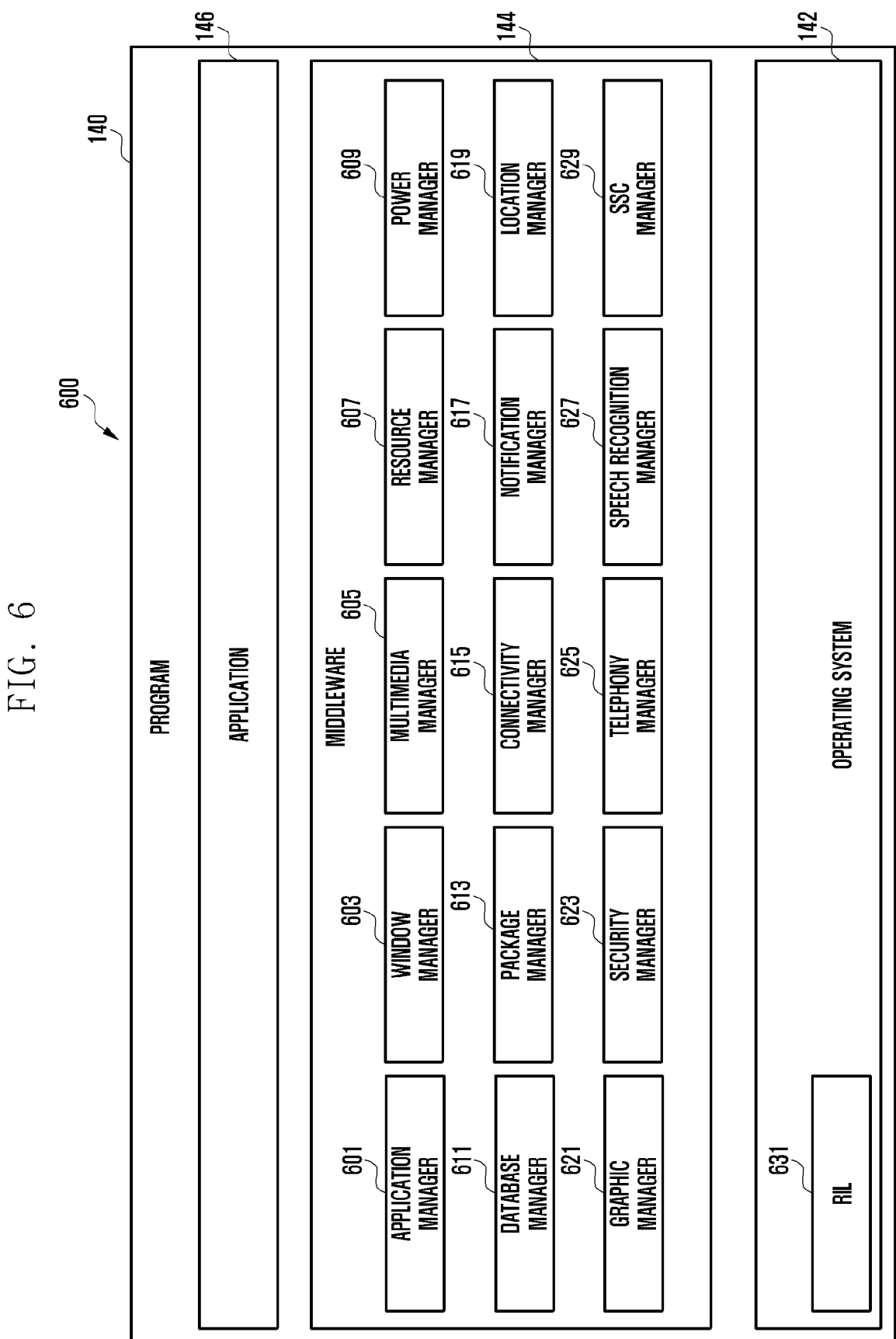
FIG. 6 is a block diagram illustrating an example of a program according to various embodiments.

FIG. 6 is a block diagram 600 illustrating an example configuration of a program according to various embodiments.

According to an embodiment, the program 140 may include an operating system 142 for controlling one or more resources of the electronic device 101, middleware 144, or an application 146 which can be executed in the operating system 142. For example, the operating system 142 may include Android™, iOS™, Windows™, Symbian™, Tizen™, or Bada™. For example, at least a part of the program 140 may be preloaded into the electronic device 101 during manufacturing, or may be downloaded or updated from an external electronic device (for example, the electronic device 102 or 104 or the server 108 in FIG. 1) when used by the user.

According to various embodiments, the operating system 142 may control management (for example, allocation or recovery) of one or more system resources (for example, processes, memories, or power) of the electronic device 101. According to an embodiment, the operating system 142 may include one or more driver programs for driving other hardware devices (for example, the processor 500 or the communication circuit 510) of the electronic device 101.

According to an embodiment, the operating system 142 may include a radio interface layer (RIL) 631 configured to identify whether the network accessed by the electronic device 101 supports circuit switched (CS) communication, or to control an emergency call scheme to be used in the electronic device 101 (for example, VoLTE emergency call scheme or CS emergency call scheme). For example, the RIL 631 may control the communication circuit 510 so as to establish or release a PDU session with a network.

According to various embodiments, the middleware 144 may provide various functions to the application 146 such that functions or information provided from one or more resources of the electronic device 101 can be used by the application 146. For example, the middleware 144 may include an application manager 601, a window manager 603, a multimedia manager 605, a resource manager 607, a power manager 609, a database manager 611, a package manager 613, a connectivity manager 615, a notification manager 617, a location manager 619, a graphic manager 621, a security manager 623, a telephony manager 625, a speech recognition manager 627, and/or an SSC manager 629.

According to an embodiment, the application manager 601 may manage the life period of the application 146. According to an embodiment, the window manager 603 may manage one or more GUI resources used on the screen. According to an embodiment, the multimedia manager 605 may recognize one or more formats necessary to play media files and may use a codec appropriate for a format selected therefrom so as to encode or decode a corresponding media file among the media files. According to an embodiment, the resource manager 607 may manage the source code of the application 146 or the memory space of the memory 130. According to an embodiment, the power manager 609 may manage the capacity, temperature, or power of the battery 180 and may use corresponding information among the same so as to determine or provide relevant information necessary for operations of the electronic device 101. According to an embodiment, the power manager 609 may interwork with the basic input/output system (BIOS) (not illustrated) of the electronic device 101.

According to an embodiment, the database manager 611 may generate, search through, or modify a database to be used by the application 146. According to an embodiment, the package manager 613 may manage installation or update of an application distributed as a package file. According to an embodiment, the connectivity manager 615 may manage wireless connection or direct connection between the electronic device 101 and an external electronic device. For example, the connectivity manager 615 may provide information related to establishment and/or release of a PDU session between the operating system 142 (or the RIL 631) and the application 146.

According to an embodiment, the notification manager 617 may provide a function for notifying the user of the occurrence of a designated event (for example, an incoming call, a message, or an alarm). According to an embodiment, the location manager 619 may mange location information of the electronic device 101. According to an embodiment, the graphic manager 621 may manage one or more graphic effects to be provided to the user, or a user interface related thereto.

According to an embodiment, the security manager 623 may provide system security or user authentication. According to an embodiment, the telephony manager 625 may manage a voice communication function or a video communication function provided by the electronic device 101. According to an embodiment, the speech recognition manager 627 may transmit the user's speech data to the server 108 and may receive a command corresponding to a function to be performed in the electronic device 101, at least partially based on the speech data, or character data converted at least partially based on the speech data from the server 108.

According to an embodiment, the SSC manager 629 may control at least one operation among configuration of a data path to be used for data communication, PDU session release, or DNS pre-resolving. For example, configuration of a data path to be used for data communication may include a series of processes for configuring a timepoint to switch the data path to IP address 2 which has been newly allocated in a state in which IP address 1 and IP address 2 of a PDU session are allocated in order to relocate the UPF in SSC mode 3 in the case of multi-homing. For example, configuration of a data path to be used for data communication may include a series of processes for configuring a timepoint to switch the data path to PDU session 2 which has been newly established in a state in which PDU session 1 and PDU session 2 are established in order to relocate the UPF in SSC mode 3 in the case of single-homing.

For example, PDU session release may include a series of processes for controlling the release of IP address 1 which has been allocated at a previous timepoint, based on switching of the data path to IP address 2 which has been newly allocated in a state in which IP address 1 and IP address 2 of the PDU session are allocated in order to relocate the UPF in SSC mode 3 in the case of multi-homing. For example, PDU session release may include a series of processes for controlling the release of PDU session 1 which has been established at a previous timepoint, based on switching of the data path to PDU session 2 which has been newly established in a state in which PDU session 1 and PDU session 2 are established in order to relocate the UPF in SSC mode 3 in the case of single-homing.

For example, DNS pre-resolving may include a series of processes for identifying a server (or server address) related to IP address 2, based on allocation of new IP address 2 (Or IP prefix 2) in order to relocate the UPF in SSC mode 3 in the case of multi-homing. For example, DNS pre-resolving may include a series of processes for identifying a server (or server address) related to PDU session 2, based on allocation of new PDU session 2 in order to relocate the UPF in SSC mode 3 in the case of single-homing.

According to an embodiment, the middleware 144 may dynamically delete some existing components or add new components. According to an embodiment, at least a part of the middleware 144 may be included as a part of the operating system 142 or implemented separate software different from the operating system 142.

According to various embodiments, the application 146 may include at least one application program related to functions provided in the electronic device 101. According to an embodiment, the application 146 may include an application program related to data communication.

According to various embodiments, the application 146 may send a request for PDU session connection to the operating system 142 (or the RIL 631) through the connectivity manager 615. The RIL 631 may control the communication circuit 510 (or a modem) so as to transmit a request message related to PDU session connection to a network. The communication circuit 510 may transmit a response message (for example, allocated IP address) regarding the request message received from the network to the RIL 613. The RIL 631 may generate a network interface in a kernel and may configure the IP address received from the communication circuit 510 in the network interface. The RIL 631 may transmit information related to the result of PDU session connection to the application 146 through the connectivity manager 615.

According to various embodiments, the application 146 may send a request for PDU session release to the operating system 142 (or the RIL 631) through the connectivity manager 615. The RIL 631 may control the communication circuit 510 (or a modem) so as to transmit a request message related to PDU session disconnection to the network. The communication circuit 510 may transmit a response message regarding the request message received from the network to the RIL 613. The RIL 631 may delete the network interface in the kernel. The RIL 631 may transmit information related to the result of PDU session disconnection to the application 146 through the connectivity manager 615.

According to various example embodiments, an electronic device (for example, the electronic device 101 in FIG. 1, FIG. 2, FIG. 3, FIG. 4, or FIG. 5) may include: a communication circuit (for example, the wireless communication module 192 in FIG. 1 or FIG. 2 or the communication circuit 510 in FIG. 5) and a processor (for example, the processor 120 in 1 or FIG. 2 or the processor 500 in FIG. 5) operatively connected to the communication circuit. According to an example embodiment, the processor may be configured to perform data communication through a protocol data unit (PDU) session and Internet protocol (IP) address 1. According to an example embodiment, the processor may be configured to identify IP address 2 of the PDU session related to modification of a data path. According to an example embodiment, the processor may be configured to identify the round trip time (RTT) based on IP address 1 being used and the RTT based on IP address 2 being used, in a state in which IP address 1 and IP address 2 of the PDU session are allocated. According to an example embodiment, the processor may be configured to modify the data path to IP address 2, based on a result of comparing the RTT in which IP address 1 is used and the RTT in which IP address 2 is used, prior to expiration of a valid lifetime of IP address 1. According to an example embodiment, the processor may be configured to release IP address 1 based on modification of the data path to IP address 2.

According to various example embodiments, the processor may be configured to identify the RTT based on IP address 1 being used and the RTT based on IP address 2 being used, in a state in which IP address 1 and IP address 2 of the PDU session are allocated, wherein the processor is configured in session and service continuity (SSC) mode 3 with a network.

According to various example embodiments, the processor may be configured to: transmit a message related to an access request to the network through the communication circuit, and establish the PDU session configured in the SSC mode 3, based on information related to SSC mode 3 included in information related to PDU establishment acceptance received from the network.

According to various example embodiments, the processor may be configured to identify the RTT in which IP address 1 is used and the RTT in which IP address 2 is used through a server related to a reference application program among multiple application programs currently executed in the electronic device.

According to various example embodiments, the processor may be configured to identify the RTT in which IP address 1 is used and the RTT in which IP address 2 is used through at least one server related to each of multiple application programs currently executed in the electronic device.

According to various example embodiments, the RTT in which at least one of IP address 1 or IP address 2 is used may include at least one of a time elapsed from a point in time at which a transmission control protocol (TCP) synchronization signal is transmitted to a server related to an application program currently executed in the electronic device, based on IP address 1 or IP address 2, to a point in time at which an ACK of the TCP synchronization signal is received from the server, a time elapsed from a timepoint at which an initial packet related to QUIC is transmitted to a server related to an application program currently executed in the electronic device, based on IP address 1 or IP address 2, to a point in time at which an ACK of the initial packet is received from the server, or a time elapsed from a timepoint at which a ping request signal of Internet control message protocol (ICMP) is transmitted to a point in time at which a ping ACK is received.

According to various example embodiments, the processor may be configured to: identify a server related to an application program to be accessed through IP address 2 through domain name system (DNS) pre-resolving, based on identification of IP address 2, and identify the RTT in which IP address 2 is used through the server related to the application program to be accessed through IP address 2.

According to various example embodiments, the processor may be configured to switch the data path to IP address 2 based on, prior to expiration of the valid lifetime of IP address 1, the difference between the RTT in which IP address 2 is used and the RTT in which IP address 1 is used being equal to or less than a designated reference value.

According to various example embodiments, the processor may be configured to maintain the data path of IP address 1 based on the difference between the RTT in which IP address 2 is used and the RTT in which IP address 1 is used exceeding the designated reference value.

According to various example embodiments, the processor may be configured to: repeatedly determine whether to switch the data path to IP address 2, based on the RTT in which IP address 2 is used and the RTT in which IP address 1 is used, based on a designated period based on the data path of IP address 1 being maintained prior to expiration of the valid lifetime of IP address 1, and switch the data path to IP address 2 based on the number of times whether to switch the data path to IP address 2 is determined exceeding a designated number of times.

According to various example embodiments, the processor may be configured to: reduce the valid lifetime of IP address 1 based on modification of the data path to IP address 2, and release IP address 1 based on expiration of the reduced valid lifetime of IP address 1.

According to various example embodiments, an electronic device (for example, the electronic device 101 in FIG. 1, FIG. 2, FIG. 3, FIG. 4, or FIG. 5) may include: a communication circuit (for example, the wireless communication module 192 in FIG. 1 or FIG. 2 or the communication circuit 510 in FIG. 5) and a processor (for example, the processor 120 in 1 or FIG. 2 or the processor 500 in FIG. 5) operatively connected to the communication circuit. According to an example embodiment, the processor may be configured to perform data communication through protocol data unit (PDU) session 1 and Internet protocol (IP) address 1. According to an example embodiment, the processor may be configured to identify PDU session 2 and IP address 2, based on PDU session modification. According to an example embodiment, the processor may be configured to identify the round trip time (RTT) related to PDU session 1 and the RTT related to PDU session 2, in a state in which PDU session 1 and PDU session 2 are allocated. According to an example embodiment, the processor may be configured to modify the data path to PDU session 2, based on a result of comparing the RTT related to PDU session 1 and the RTT related to PDU session 2, prior to expiration of the valid lifetime of PDU session 1.

According to an example embodiment, the processor may be configured to release PDU session 1 based on modification of the data path to PDU session 2.

Figure 7:
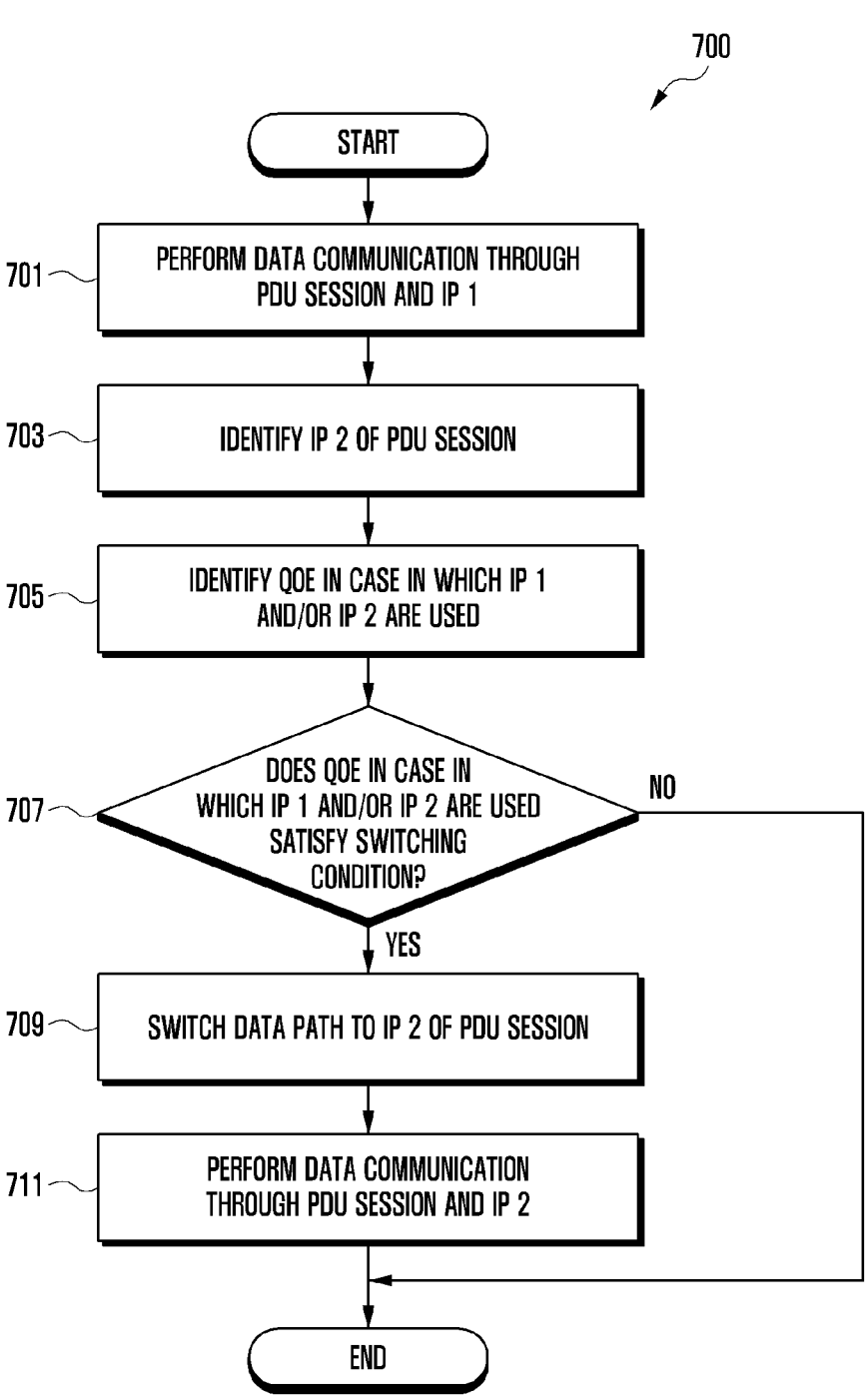
FIG. 7 is a flowchart illustrating an example method for modifying a data path using multi-homing in an electronic device according to various embodiments.

FIG. 7 is a flowchart 700 illustrating an example method for modifying a data path using multi-homing in an electronic device according to various embodiments. In the following example embodiment, respective operations may be performed successively, but are not necessarily performed successively. For example, the order of respective operations may be changed, and at least two operations may be performed in parallel. As an example, the electronic device in FIG. 7 may be the electronic device 101 in FIG. 1, FIG. 2, FIG. 3, FIG. 4, or FIG. 5.

According to various embodiments referring to FIG. 7, the electronic device (for example, the processor 120 in FIG. 1 or the processor 500 in FIG. 5) may perform data communication based on a protocol data unit (PDU) session and IP address 1 allocated from a network in operation 701. According to an embodiment, the processor 500 may control the communication circuit 510 so as to transmit a message related to a request for access to a server (or content server) to a network (for example, the RAN 410 in FIG. 4), based on the occurrence of an event related to data communication. As an example, the access request-related message may include at least one of PDU session identification information (for example, PDU session ID) or SSC mode-related information (for example, SSC mode 3). As an example, the event related to data communication may occur based on at least one of execution of an application program related to data communication, execution of a function, user input reception, or communication signal reception. According to an embodiment, the processor 500 may control the communication circuit 510 so as to establish a PDU session for data communication, based on control information received from the network in response to transmission of the access request-related message. For example, the processor 500 may determine that establishment of a PDU session configured in SSC mode 3 is completed, based on information related to SSC mode 3 included in information (for example, PDU session establishment accept) related to PDU establishment acceptance received from the network. As an example, control information received from the network may include information related to PDU establishment acceptance, PDU session identification information, information related to at least one of SSC mode or IP address 1 (or IP prefix 1).

According to various embodiments, the electronic device (for example, the processor 120 or 500) may identify IP address 2 newly allocated to the PDU session by the network, based relocation of the UPF related to the PDU session, in operation 703. According to an embodiment, the processor 500 may determine that the UPF has been relocated, based on receiving information related to IP prefix 1 having a preferred lifetime configured as a first value (for example, "0") and information related to IP prefix 2 from the network through the communication circuit 510, in the case of multi-homing. The processor 500 may generate new IP address 2 of the PDU session based on IP prefix 2 received from the network. As an example, IP prefix 1 may be information (for example, network ID) configured by the network so as to include IP address 1 for access to UPF 1, and may include IP address 1 together with host identification information (for example, host ID). As an example, IP prefix 2 may be information (for example, network ID) configured by the network so as to include IP address 2 for access to UPF 2, based on a UPF relocation, and may include IP address 2 together with host identification information (for example, host ID).

According to various embodiments, the electronic device (for example, the processor 120 or 500) may identify the quality of experience (QoE) when communication is performed using IP address 1 and/or IP address 2 of the PDU session configured in SSC mode 3 in operation 705. As an example, the QoE may include at least one of a round trip time (RTT), path loss, or throughput. According to an embodiment, the processor 500 may determine that the time elapsed from a timepoint at which a transmission control protocol (TCP) synchronization signal is transmitted to a server related to an application program, based on IP address 1, to a timepoint at which an ACK of the TCP synchronization signal is received from the server is the RTT in a case in which IP address 1 is used. The processor 500 may determine that the time elapsed from a timepoint at which a TCP synchronization signal is transmitted to a server related to an application program, based on IP address 2, to a timepoint at which an ACK of the TCP synchronization signal is received from the server is the RTT in a case in which IP address 2 is used. The processor 500 may determine that the time elapsed from a timepoint at which an initial packet related to QUIC is transmitted to a server related to an application program, based on IP address 1, to a timepoint at which an ACK of the initial packet is received is the RTT in a case in which IP address 1 is used. The processor 500 may determine that the time elapsed from a timepoint at which an initial packet related to QUIC is transmitted to a server related to an application program, based on IP address 2, to a timepoint at which an ACK of the initial packet is received is the RTT in a case in which IP address 2 is used. According to an embodiment, the processor 500 may determine that the time elapsed from a timepoint at which a ping request signal of Internet control message protocol (ICMP) is transmitted using IP address 1 to a timepoint at which a ping ACK is received is the RTT in a case in which IP address 1 is used. The processor 500 may determine that the time elapsed from a timepoint at which a ping request signal of ICMP is transmitted using IP address 2 to a timepoint at which a ping ACK is received is the RTT in a case in which IP address 2 is used. According to an embodiment, the RTT in a case in which IP address 1 and/or IP address 2 are used may be determined as a combination of at least one of an RTT based on a TCP synchronization signal, an RTT based on an initial packet related to QUIC, or an RTT based on a ping request signal. For example, the RTT in a case in which IP address 1 and/or IP address 2 are used may include an RTT in a case in which IP address 1 and/or IP address 2 of a foreground application program among application programs executed in the electronic device 101 are used. For example, the RTT in a case in which IP address 1 and/or IP address 2 are used may include the average of RTTs in cases in which IP address 1 and/or IP address 2 of application programs executed in the electronic device 101 are used.

According to an embodiment, the processor 500 may detect (or measure) the RTT in a case in which IP address 1 is used through a server related to an application program executed in the electronic device 101. The processor 500 may identify a server (or the IP address of the server) related to an application program to be accessed through IP address 2 through pre-resolving of a domain name system (DNS) based on allocation of IP address 2 (or IP prefix 2). The processor 500 may detect (or measure) the RTT in a case in which IP address 2 is used through a server related to an application program to be accessed through IP address 2. As an example, the server related to an application program to be accessed through IP address 2 may be identical to or different from the server related to an application program to be accessed through IP address 1.

According to various embodiments, the electronic device (for example, the processor 120 or 500) may identify whether the QoE in a case in which communication is performed using IP address 1 and/or IP address 2 satisfies a designated switching condition in operation 707. According to an embodiment, the processor 500 may identify whether the designated switching condition is satisfied, based on the RTT in a case in which IP address 2 is used and the RTT in a case in which IP address 1 is used, while the valid lifetime of IP address 1 exists. For example, a state in which the designated switching condition is satisfied may include a state in which the difference between the RTT in a case in which IP address 2 is used and the RTT in a case in which IP address 1 is used is equal to/less than a designated first reference value. For example, a state in which the designated switching condition is not satisfied may include a state in which the difference between the RTT in a case in which IP address 2 is used and the RTT in a case in which IP address 1 is used exceeds the designated first reference value. As an example, a state in which the valid lifetime of IP address 1 of the PDU session exists may include a state prior to expiration of IP address 1 of the PDU session. According to an embodiment, the processor 500 may identify whether the designated switching condition is satisfied, based on packet loss in a case in which IP address 1 is used while the valid lifetime of IP address 1 exists. For example, a state in which the designated switching condition is satisfied may include a state in which the packet loss when IP address 1 is used exceeds designated reference loss. For example, a state in which the designated switching condition is not satisfied may include a state in which the packet loss when IP address 1 is used is equal to/less than the designated reference loss.

According to various embodiments, if the QoE in a case in which communication is performed using IP address 1 and/or IP address 2 does not satisfy the designated switching condition ("No" in operation 707), the electronic device (for example, the processor 120 or 500) may end the procedure for data path switching. According to an embodiment, the processor 500 may determine that the quality of data communication of IP address 1 is better than that of IP address 2 if the QoE in a case in which communication is performed using IP address 1 and/or IP address 2 while the valid lifetime of IP address 1 of the PDU session exists does not satisfy the designated switching condition. The processor 500 may maintain the data path of IP address 1 of the PDU session. According to an embodiment, the processor 500 may switch the data path to IP address 2 if the valid lifetime of IP address 1 of the PDU session expires.

According to various embodiments, if the QoE in a case in which communication is performed using IP address 1 and/or IP address 2 satisfies the designated switching condition ("Yes" in operation 707), the electronic device (for example, the processor 120 or 500) may switch the data path to IP address 2 of the PDU session in operation 709. According to an embodiment, the processor 500 may determine that the quality of data communication of IP address 2 is better than that of IP address 1, or that the quality of data communication of IP address 1 is similar to that of IP address 2, if the QoE in a case in which communication is performed using IP address 1 and/or IP address 2 while the valid lifetime of IP address 1 of the PDU session exists satisfies the designated switching condition. The processor 500 may switch the data path to IP address 2 of the PDU session while the valid lifetime of IP address 1 of the PDU session exists. For example, data path switching may include a series of a routing switching operations in which the routing table value of the processor 500 is modified based on IP address 2.

According to an embodiment, the processor 500 may update the valid lifetime of IP address 1, based on switching of the data path to IP address 2 of the PDU session. For example, the processor 500 may reduce the valid lifetime of IP address 1 with reference to a designated interval. For example, the processor 500 may repeatedly update the valid lifetime of IP address 1 if the valid lifetime of IP address 1 exists. For example, the processor 500 may release IP address 1 if the valid lifetime of IP address 1 expires. As an example, the designated interval may include half the valid lifetime (for example, remaining valid lifetime) of IP address 1 or a fixed interval, as a reference range for reducing the valid lifetime (for example, remaining valid lifetime) of IP address 1.

According to various embodiments, the electronic device (for example, the processor 120 or 500) may perform data communication through IP address 2 of the PDU session in operation 711.

Figure 8:
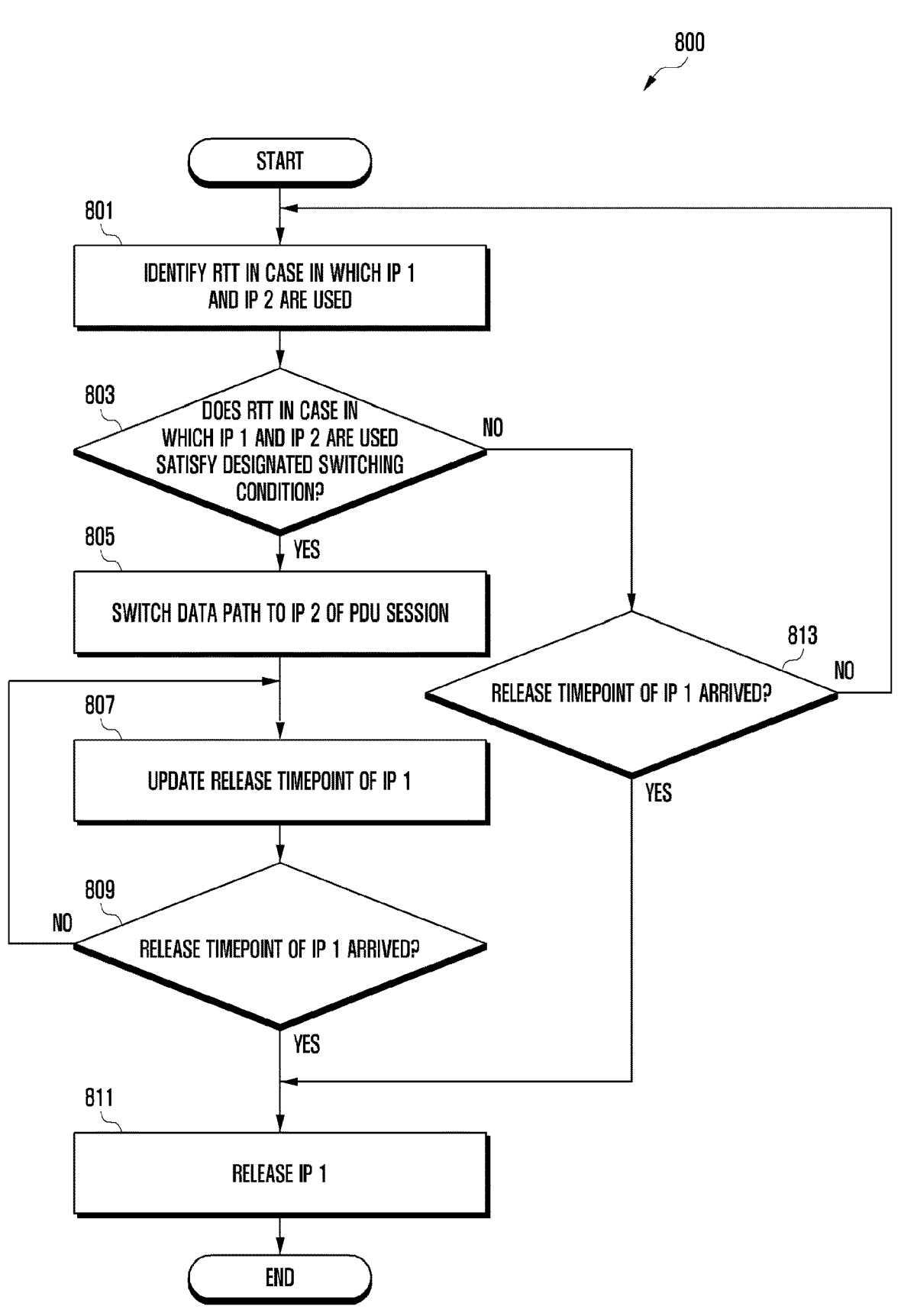
FIG. 8 is a flowchart illustrating an example method for configuring a timepoint to switch a data path, based on an RTT, in an electronic device according to various embodiments.

FIG. 8 is a flowchart 800 illustrating an example method for configuring a timepoint to switch a data path, based on an RTT, in an electronic device according to various embodiments. According to an embodiment, at least a part of FIG. 8 may include detailed operations of operation 705 to operation 711 in FIG. 7. In the following example embodiment, respective operations may be performed successively, but are not necessarily performed successively. For example, the order of respective operations may be changed, and at least two operations may be performed in parallel. As an example, the electronic device in FIG. 8 may be the electronic device 101 in FIG. 1, FIG. 2, FIG. 3, FIG. 4, or FIG. 5.

According to various embodiments referring to FIG. 8, the electronic device (for example, the processor 120 in FIG. 1 or the processor 500 in FIG. 5) may identify the round trip time (RTT) in a case in which IP address 1 and IP address 2 of a PDU session are used in operation 801 in a case in which IP address 1 and IP address 2 are allocated to a PDU session configured in SSC mode 3 (for example, operation 703 in FIG. 7). According to an embodiment, the processor

500 may detect (or measure) the RTT in a case in which IP address 1 and/or IP address 2 are used with regard to a server related to the foreground application program among application programs executed in the electronic device 101. As an example, the foreground application program may indicate an application program having a graphic user interface (GUI) displayed at the top end of the display (not illustrated) of the electronic device 101 among application programs executed in the electronic device 101.

According to an embodiment, the processor 500 may detect (or measure) the average of RTTs in a case in which IP address 1 and/or IP address 2 regarding servers related to respective application programs executed in the electronic device 101 are used. As an example, application programs executed in the electronic device 101 may include an application program having an open (or activated) socket for transmitting and/or receiving messages of the application program.

According to an embodiment, the processor 500 may determine (or measure) the RTT in a case in which IP address 1 and/or IP address 2 are used, based on at least one of a TCP synchronization signal to a server related to an application program, an initial packet related to QUIC, or a ping request signal.

According to an embodiment, the processor 500 may detect (or measure) the RTT in a case in which IP address 1 is used through a server related to an application program executed in the electronic device 101. The processor 500 may identify a server (or the IP address of the server) related to an application program to be accessed through IP address 2 through DNS pre-resolving based on allocation of IP address 2 (or IP prefix 2). The processor 500 may detect (or measure) the RTT in a case in which IP address 2 is used through a server related to an application program to be accessed through IP address 2.

According to various embodiments, the electronic device (for example, the processor 120 or 500) may identify whether the RTT in a case in which IP address 1 and IP address 2 are used satisfies a designated switching condition in operation 803. According to an embodiment, the processor 500 may identify whether the designated switching condition is satisfied, based on the RTT in a case in which IP address 2 is used and the RTT in a case in which IP address 1 is used, while the valid lifetime of IP address 1 exists. For example, a state in which the designated switching condition is satisfied may include a state in which the difference between the RTT in a case in which IP address 2 is used and the RTT in a case in which IP address 1 is used is equal to/less than a designated first reference value. For example, a state in which the designated switching condition is not satisfied may include a state in which the difference between the RTT in a case in which IP address 2 is used and the RTT in a case in which IP address 1 is used exceeds the designated first reference value. As an example, a state in which the valid lifetime of IP address 1 of the PDU session exists may include a state prior to expiration of IP address 1 of the PDU session.

According to various embodiments, if the RTT in a case in which IP address 1 and IP address 2 are used satisfies a designated switching condition (for example, "Yes" in operation 803), the electronic device (for example, the processor 120 or 500) may switch the data path to IP address 2 of the PDU session in operation 805. According to an embodiment, the processor 500 may determine that the quality of data communication of IP address 2 is better than that of IP address 1, or that the quality of data communication of IP address 1 is similar to that of IP address 2, if the RTT in a case in which IP address 1 and IP address 2 are used while the valid lifetime of IP address 1 of the PDU session exists satisfies the designated switching condition. The processor 500 may switch the data path to IP address 2 of the PDU session while the valid lifetime of IP address 1 of the PDU session exists. The processor 500 may control the communication circuit 510 so as to perform data communication through IP address 2 of the PDU session, based on data path switching.

According to various embodiments, the electronic device (for example, the processor 120 or 500) may update the valid lifetime (or release timepoint) of IP address 1 of the PDU session in operation 807. According to an embodiment, the processor 500 may reduce the valid lifetime of IP address 1 with reference to a designated interval. As an example, the designated interval may include half the valid lifetime (for example, remaining valid lifetime) of IP address 1 or a fixed interval, as a reference range for reducing the valid lifetime (for example, remaining valid lifetime) of IP address 1 at once.

According to various embodiments, the electronic device (for example, the processor 120 or 500) may identify whether the updated valid lifetime (or termination timepoint) of IP address 1 of the PDU session arrives in operation 809.

According to various embodiments, if the updated valid lifetime (or termination timepoint) of IP address 1 of the PDU session has not arrived ("No" in operation 809), the electronic device (for example, the processor 120 or 500) may update the valid lifetime (or release timepoint) of IP address 1 of the PDU session in operation 807. According to an embodiment, the processor 500 may repeatedly update the valid lifetime of IP address 1 if the valid lifetime of IP address 1 exists. As an example, the valid lifetime of IP address 1 of the PDU session may be updated based on a designated period.

According to various embodiments, if the updated valid lifetime (or termination timepoint) of IP address 1 of the PDU session has arrived (for example, "Yes" in operation 809), the electronic device (for example, the processor 120 or 500) may release IP address 1 of the PDU session in operation 811. According to an embodiment, the processor 500 may release IP address 1 of the PDU session by closing the socket of the application program related to IP address 1 of the PDU session. As an example, a state in which the valid lifetime (or updated valid lifetime) of IP address 1 arrives may include a state in which the valid lifetime of IP address 1 is equal to/less than a designated minimum valid lifetime.

According to various embodiments, if the RTT in a case in which IP address 1 and IP address 2 are used does not satisfy the designated switching condition (for example, "No" in operation 803), the electronic device (for example, the processor 120 or 500) may identify whether the updated valid lifetime (or termination timepoint) of IP address 1 of the PDU session arrives in operation 813. According to an embodiment, if the RTT in a case in which IP address 1 and IP address 2 are used while the valid lifetime of IP address 1 exists does not satisfy the designated switching condition, the processor 500 may maintain the data path of IP address 1 of the PDU session.

According to various embodiments, if the valid lifetime (or termination timepoint) of IP address 1 of the PDU session has not arrived (for example, "No" in operation 813), the electronic device (for example, the processor 120 or 500) may identify the RTT in a case in which IP address 1 and IP address 2 of the PDU session are used in operation 801. According to an embodiment, if the data path of IP address 1 of the PDU session is maintained while the valid lifetime of IP address 1 exists, the processor 500 may identify and compare the RTT in a case in which IP address 1 and IP address 2 are used, based on a designated period, thereby identifying whether it is possible to switch the data path to IP address 2 of the PDU session.

According to an embodiment, if the number of times it is identified whether to switch the data path while the valid lifetime of IP address 1 exists exceeds a designated number of times, the processor 500 may switch the data path to IP address 2 of the PDU session.

According to an embodiment, if transmission and reception of data based on IP address 1 of the PDU session do not exist during a designated first reference time while the valid lifetime of IP address 1 exists, the processor 500 may switch the data path to IP address 2 of the PDU session.

According to various embodiments, if the valid lifetime (or termination timepoint) of IP address 1 of the PDU session has arrived (for example, "Yes" in operation 813), the electronic device (for example, the processor 120 or 500) may release IP address 1 of the PDU session in operation 811. According to an embodiment, if the valid lifetime of IP address 1 expires, the processor 500 may switch the data path to IP address 2 of the PDU session.

Figure 9:
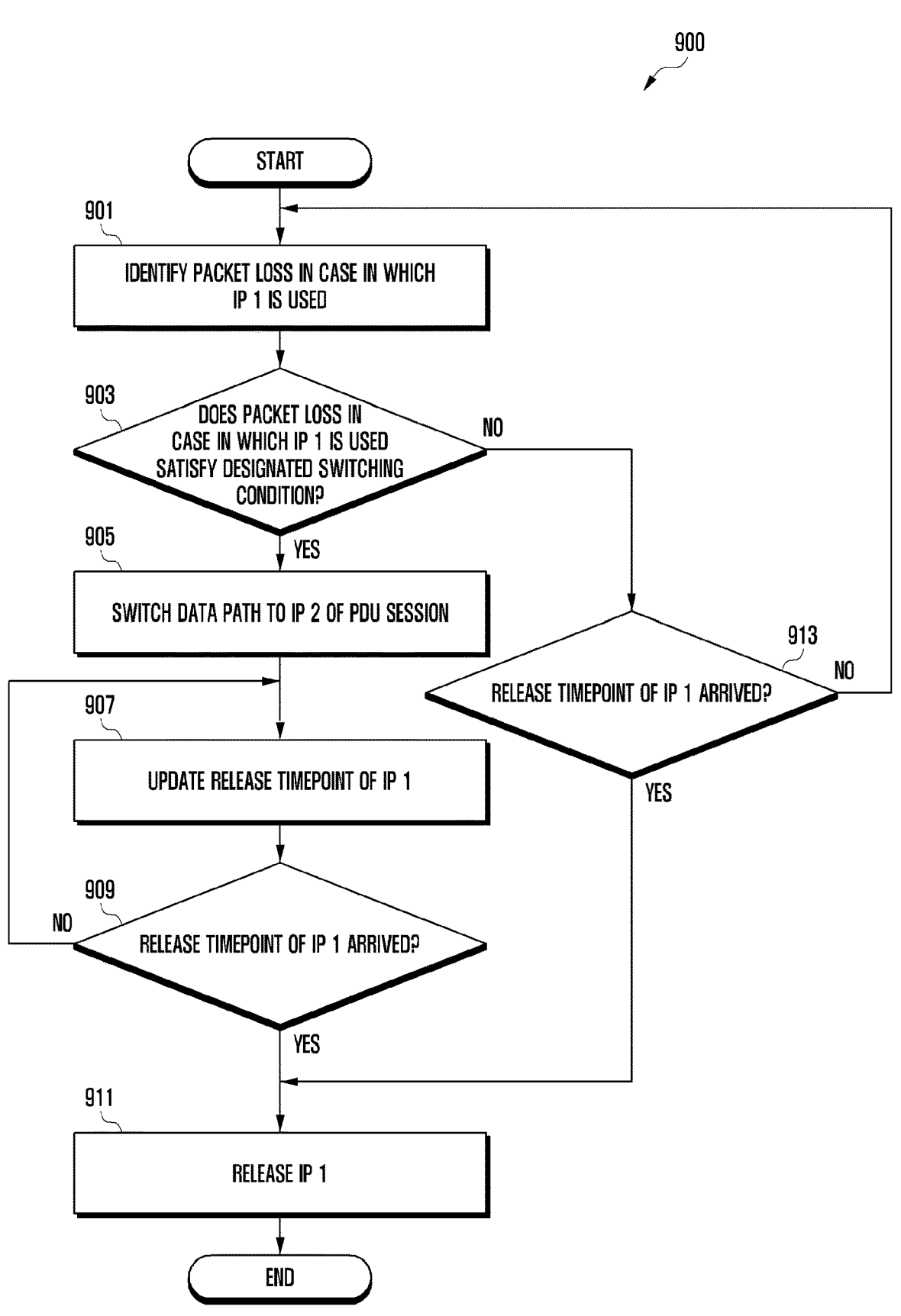
FIG. 9 is a flowchart illustrating an example method for configuring a timepoint to switch a data path, based on packet loss, in an electronic device according to various embodiments.

FIG. 9 is a flowchart 900 illustrating an example method for configuring a timepoint to switch a data path, based on packet loss, in an electronic device according to various embodiments. According to an embodiment, at least a part of FIG. 9 may include detailed operations of operation 705 to operation 711 in FIG. 7. In the following example embodiment, respective operations may be performed successively, but are not necessarily performed successively. For example, the order of respective operations may be changed, and at least two operations may be performed in parallel. As an example, the electronic device in FIG. 9 may be the electronic device 101 in FIG. 1, FIG. 2, FIG. 3, FIG. 4, or FIG. 5.

According to various embodiments referring to FIG. 9, the electronic device (for example, the processor 120 in FIG. 1 or the processor 500 in FIG. 5) may identify packet loss in a case in which IP address 1 of a PDU session is used in operation 901 in a case in which IP address 1 and IP address 2 are allocated to a PDU session in order to relocate the UPF in SSC mode 3 (for example, operation 703 in FIG. 7). According to an embodiment, the processor 500 may identify the ratio of loss of data (packet) transmitted and/or received based on IP address 1 of the PDU session during a designated time.

According to various embodiments, the electronic device (for example, the processor 120 or 500) may identify whether the packet loss in a case in which IP address 1 is used satisfies a designated switching condition in operation 903. According to an embodiment, the processor 500 may determine that the designated switching condition is satisfied if the packet loss in a case in which IP address 1 is used exceeds designated reference loss while the valid lifetime of IP address 1 exists. According to an embodiment, the processor 500 may determine that the designated switching condition is not satisfied if the packet loss in a case in which IP address 1 is used while the valid lifetime of IP address 1 exists is equal to/less than the designated switching condition. As an example, a state in which the valid lifetime of IP address 1 of the PDU session exists may include a state prior to expiration of IP address 1 of the PDU session.

According to various embodiments, if the packet loss in a case in which IP address 1 is used satisfies the designated switching condition (for example, "Yes" in operation 903), the electronic device (for example, the processor 120 or 500) may switch the data path to IP address 2 of the PDU session in operation 905. According to an embodiment, the processor 500 may determine that the quality of data communication of IP address 1 is relatively degraded if the packet loss in a case in which IP address 1 is used while the valid lifetime of IP address 1 of the PDU session exists satisfies the designated switching condition. The processor 500 may switch the data path to IP address 2 of the PDU session while the valid lifetime of IP address 1 of the PDU session exists. The processor 500 may control the communication circuit 510 so as to perform data communication through IP address 2 of the PDU session, based on data path switching.

According to various embodiments, the electronic device (for example, the processor 120 or 500) may update the valid lifetime (or release timepoint) of IP address 1 of the PDU session in operation 907. According to an embodiment, the processor 500 may reduce the valid lifetime of IP address 1 of the PDU session with reference to a designated interval.

According to various embodiments, the electronic device (for example, the processor 120 or 500) may identify whether the updated valid lifetime (or termination timepoint) of IP address 1 of the PDU session arrives in operation 909.

According to various embodiments, if the updated valid lifetime (or termination timepoint) of IP address 1 of the PDU session has not arrived (for example, "No" in operation 909), the electronic device (for example, the processor 120 or 500) may update the valid lifetime (or release timepoint) of IP address 1 of the PDU session in operation 907. According to an embodiment, the processor 500 may repeatedly update the valid lifetime of IP address 1 if the valid lifetime of IP address 1 exists. As an example, the valid lifetime of IP address 1 of the PDU session may be updated based on a designated period.

According to various embodiments, if the updated valid lifetime (or termination timepoint) of IP address 1 of the PDU session has arrived (for example, "Yes" in operation 909), the electronic device (for example, the processor 120 or 500) may release IP address 1 of the PDU session in operation 911. As an example, releasing IP address 1 of the PDU session may include a series of operations in which the socket of the application program related to IP address 1 of the PDU session is closed.

According to various embodiments, if the packet loss in a case in which IP address 1 is used does not satisfy the designated switching condition (for example, "No" in operation 903), the electronic device (for example, the processor 120 or 500) may identify whether the valid lifetime (or termination timepoint) of IP address 1 of the PDU session arrives in operation 913. According to an embodiment, if the packet loss in a case in which IP address 1 is used while the valid lifetime of IP address 1 exists does not satisfy the designated switching condition, the processor 500 may maintain the data path of IP address 1 of the PDU session.

According to various embodiments, if the valid lifetime (or termination timepoint) of IP address 1 of the PDU session has not arrived (for example, "No" in operation 913), the electronic device (for example, the processor 120 or 500) may identify the packet loss in a case in which IP address 1 of the PDU session is used in operation 901. According to an embodiment, if the data path of IP address 1 of the PDU session is maintained while the valid lifetime of IP address 1 exists, the processor 500 may identify whether the packet loss in a case in which IP address 1 is used satisfies the designated switching condition, based on a designated period, thereby identifying whether it is possible to switch the data path to IP address 2 of the PDU session.

According to an embodiment, if the number of times it is identified whether to switch the data path while the valid lifetime of IP address 1 exists exceeds a designated number of times, the processor 500 may switch the data path to IP address 2 of the PDU session.

According to an embodiment, if transmission and reception of data based on IP address 1 of the PDU session do not exist during a designated first reference time while the valid lifetime of IP address 1 exists, the processor 500 may switch the data path to IP address 2 of the PDU session.

According to various embodiments, if the valid lifetime (or termination timepoint) of IP address 1 of the PDU session has arrived (for example, "Yes" in operation 913), the electronic device (for example, the processor 120 or 500) may release IP address 1 of the PDU session in operation 911. According to an embodiment, if the valid lifetime of IP address 1 expires, the processor 500 may switch the data path to IP address 2 of the PDU session.

Figure 10:
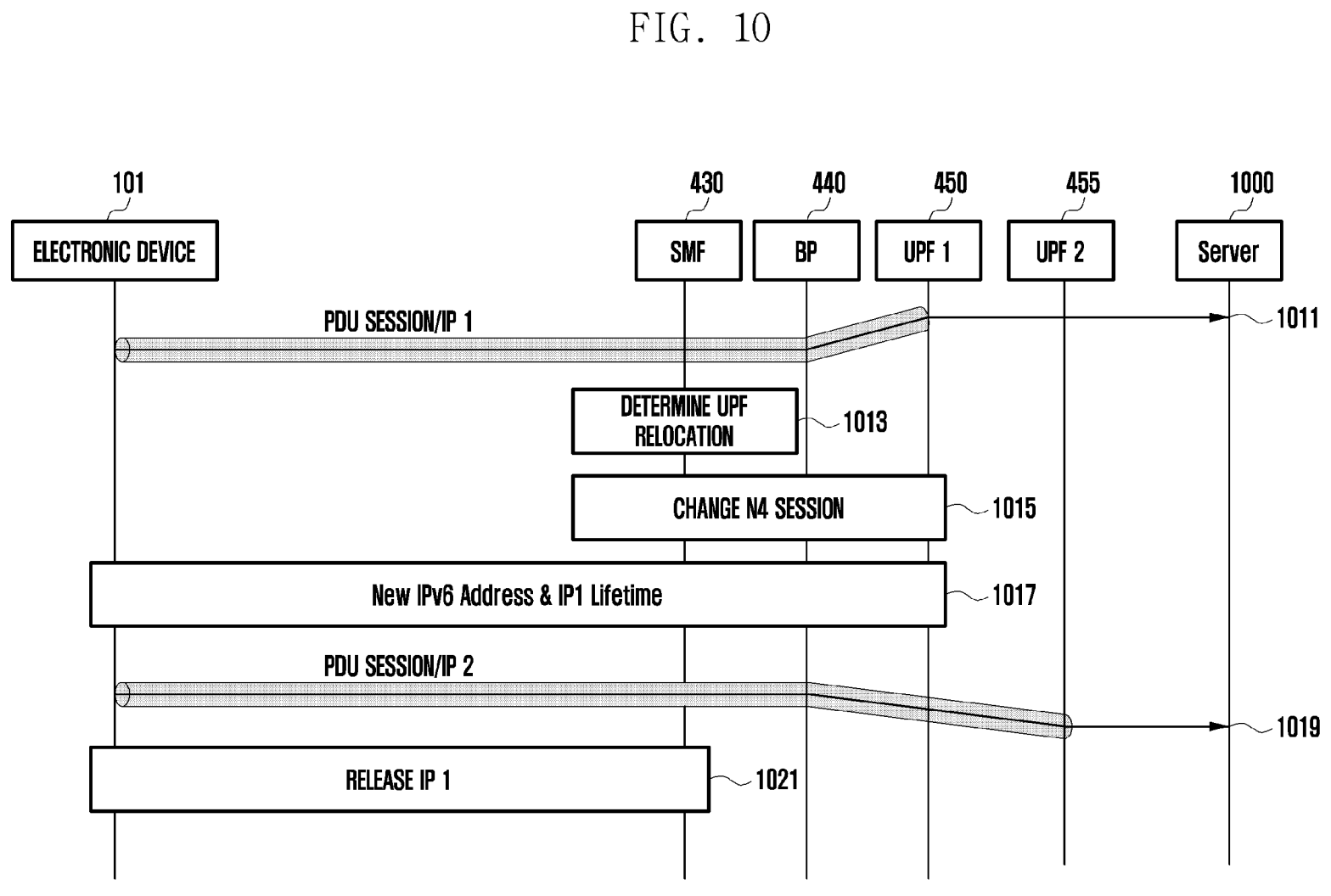

FIG. 10 is a signal flow diagram an example method for modifying a data path using multi-homing in an electronic device according to various embodiments.

According to various embodiments referring to FIG. 10, the electronic device 101 may perform data communication with a server 1000 through UPF 1 450, based on a protocol data unit (PDU) session configured in SSC mode 3 and IP address 1 (operation 1011). According to an embodiment, the UPF BP 440 may connect the PDU session with the electronic device 101 to UPF 1 450, based on IP address 1 received from the electronic device 101. The electronic device 101 may perform data communication with the server 1000 through UPF 1 450 connected through the UPF BP 440 (operation 1011). For example, the electronic device 101 may use IP address 1 as the source IP of IP communication in the case of access routing to the PDU session.

According to various embodiments, the SMF 430 may determine relocation of the UPF, based on at least one of the position of the electronic device 101, load of the UPF 1 450, connection information of a base station (for example, RAN 410), or requirement of an application program executed in the electronic device 101 (operation 1013). According to an embodiment, the SMF 430 may determine relocation of the UPF upon determining that the PDU session with the electronic device 101 can use a relatively short data transmission path if UPF 1 450 is relocated to another UPF (for example, UPF 2 455), or that the reduced data arrival time benefits the electronic device 101 and/or the network operator.

According to various embodiments, upon determining relocation of the UPF (operation 1013), the SMF 430 may connect the path (for example, N9 Session) after UPF BP 440 to new UPF 2 455 (operation 1015). For example, in the case of multi-homing, the PDU session connected in the electronic device 101 may not change regardless of relocation of the UPF, and the path (for example, N9 Session) from UPF BP 440 to the UPF (for example, UPF 1 450 and/or UPF 2 455) inside the network may solely change.

According to various embodiments, the network (for example, SMF 430) may allocate IP address 2 (or IP prefix 2) which is a new IP address to be used in UPF 2 455, to the electronic device 101, based on UPF relocation (operation 1017). The network (for example, SMF 430) may provide the electronic device 101 with the valid lifetime of IP address 1 (or IP prefix 1) previously allocated to the electronic device 101 (operation 1017). The network (for example, SMF 430) may provide the electronic device 101 with information related to the preferred lifetime of IP address 1 (or IP prefix 1) configured as a first value (for example, "0"). As an example, the valid lifetime of IP address 1 (or IP prefix 1) may be configured as a second value different from the first value.

According to various embodiments, the electronic device 101 may determine that the UPF has been relocated upon receiving information related to IP address 1 (or IP prefix 1) having a preferred lifetime configured as a first value (for example, "0") and information related to IP address 2 (or IP prefix 2) from the network. The electronic device 101 may generate new IP address 2 of the PDU session, based on information related to IP address 2 (or IP prefix 2) received from the network.

According to various embodiments, the electronic device 101 may switch the data path to IP address 2 of the PDU session (operation 1019). According to an embodiment, the electronic device 101 may configure IP address 2 as the source IP address. According to an embodiment, the electronic device 101 may identify the quality of experience (QoE) in a case in which communication is performed using IP address 1 and/or IP address 2 of the PDU session allocated to relocate the UPF in SSC mode 3. The electronic device 101 may switch the data path to IP address 2 of the PDU session upon determining that the QoE in a case in which communication is performed using IP address 1 and/or IP address 2 satisfies a designated switching condition. As an example, the QoE may include at least one of a round trip time (RTT), path loss, or throughput.

According to an embodiment, upon determining that the QoE in a case in which communication is performed using IP address 1 and/or IP address 2 does not satisfy the designated switching condition, the electronic device 101 may identify whether the designated switching condition is satisfied by identifying the QoE in a case in which communication is performed using IP address 1 and/or IP address 2, based on a designated period. If the number of times it is identified whether to switch the data path while the valid lifetime of IP address 1 exists exceeds a designated number of times, the electronic device 101 may switch the data path to IP address 2 of the PDU session.

According to an embodiment, if the valid lifetime of IP address 1 expires, the electronic device 101 may switch the data path to IP address 2 of the PDU session. As an example, a state in which the valid lifetime of IP address 1 expires may include a state in which the valid lifetime of IP address 1 is equal to/less than a designated minimum valid lifetime.

According to an embodiment, if transmission and reception of data based on IP address 1 of the PDU session do not exist during a designated first reference time while the valid lifetime of IP address 1 exists, the electronic device 101 may switch the data path to IP address 2 of the PDU session.

According to various embodiments, the electronic device 101 may release IP address 1 if the valid lifetime of IP address 1 expires (operation 1021). According to an embodiment, the electronic device 101 may update the valid lifetime of IP address 1, based on switching of the data path to IP address 2 of the PDU session. For example, the processor 500 may reduce the valid lifetime of IP address 1 with reference to a designated interval. For example, if the valid lifetime of IP address 1 exists, the processor 500 may repeatedly update the valid lifetime of IP address 1. According to an embodiment, the electronic device 101 may release IP address 1 if the updated valid lifetime of IP address 1 expires.

Figure 11:
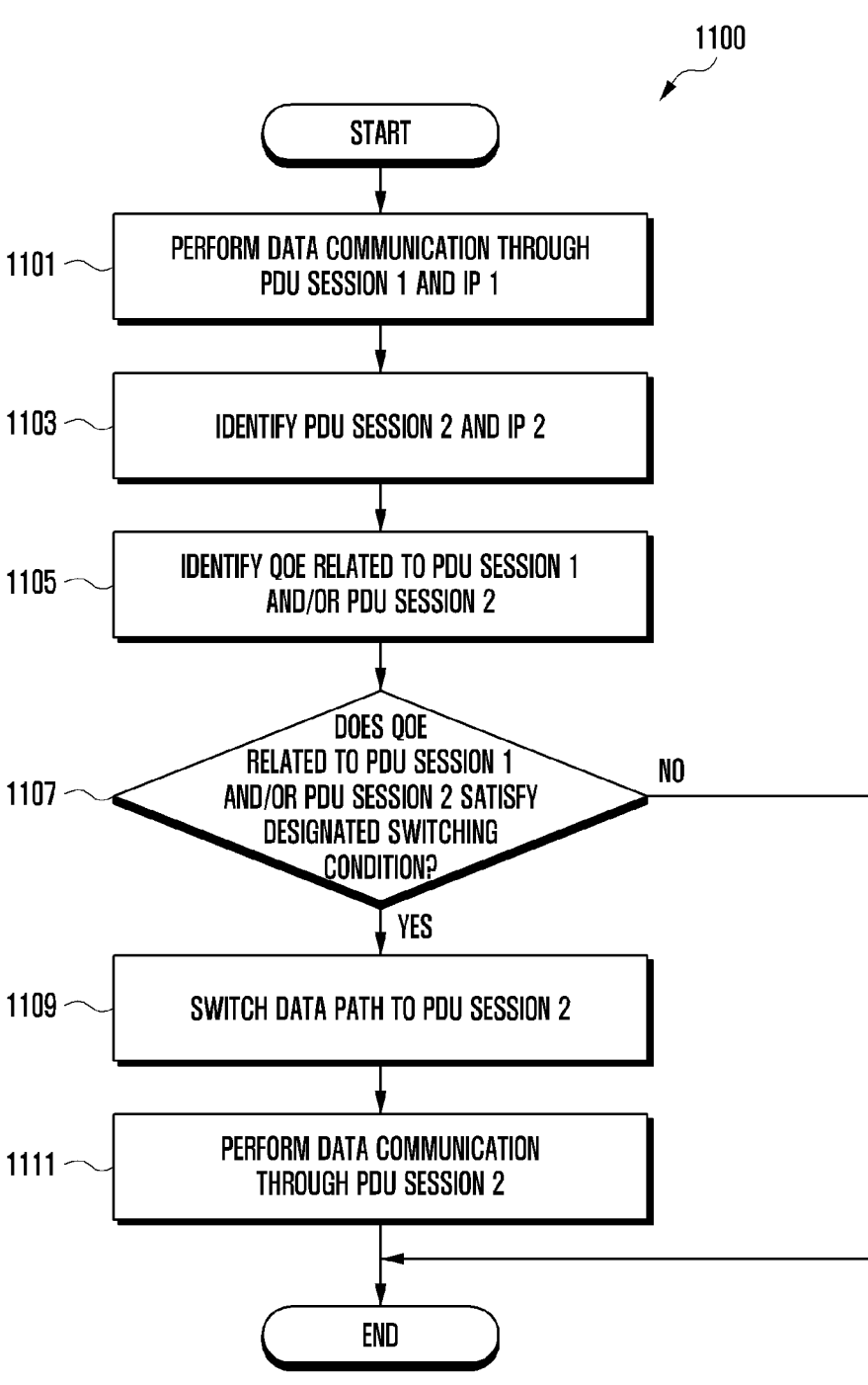
FIG. 11 is a flowchart illustrating an example method for modifying a data path using single-homing in an electronic device according to various embodiments.

FIG. 11 is a flowchart 1100 illustrating an example method for modifying a data path using single-homing in an electronic device according to various embodiments. In the following example embodiment, respective operations may be performed successively, but are not necessarily performed successively. For example, the order of respective operations may be changed, and at least two operations may be performed in parallel. As an example, the electronic device in FIG. 11 may be the electronic device 101 in FIG. 1, FIG. 2, FIG. 3, FIG. 4, or FIG. 5.

According to various embodiments referring to FIG. 11, the electronic device (for example, the processor 120 in FIG. 1 or the processor 500 in FIG. 5) may perform data communication based on a protocol data unit (PDU) session 1 and IP address 1 allocated from a network in operation 1101. According to an embodiment, the processor 500 may control the communication circuit 510 so as to transmit a message related to a request for access to a server (or content server) to a network (for example, the RAN 410 in FIG. 4), based on the occurrence of an event related to data communication. As an example, the access request-related message may include at least one of PDU session identification information (for example, PDU session ID) or SSC mode-related information (for example, SSC mode 3). As an example, the event related to data communication may occur based on at least one of execution of an application program related to data communication, execution of a function, user input reception, or communication signal reception. According to an embodiment, the processor 500 may control the communication circuit 510 so as to establish PDU session 1 for data communication, based on control information received from the network in response to transmission of the access request-related message. For example, the processor 500 may determine that establishment of PDU session 1 configured in SSC mode 3 is completed, based on information related to SSC mode 3 included in information related to PDU establishment acceptance received from the network. As an example, control information received from the network may include information related to PDU establishment acceptance, PDU session identification information, information related to at least one of SSC mode or IP address 1 (or IP prefix 1).

According to various embodiments, the electronic device (for example, the processor 120 or 500) may identify IP address 2 and PDU session 2 newly allocated by the network, based PDU session modification, in operation 1103. According to an embodiment, the processor 500 may receive information (for example, PDU session modification command) related to PDU session modification from the network through the communication circuit 510, in the case of single-homing. The processor 500 may control the communication circuit 510 so as to transmit a response message (for example, PDU session modification complete) regarding reception of information related to PDU session modification to the network. The processor 500 may control the communication circuit 510 so as to transmit information (for example, PDU session modification request) related to a PDU session modification request to the network in order to establish a new PDU session. The processor 500 may determine that establishment of PDU session 2 configured in SSC mode 3 is completed, based on an ACK received from the network in response to the information related to a PDU session modification request. As an example, the information related to PDU session modification may include the valid lifetime of IP address 1 (or IP prefix 1) of PDU session 1, information related to PDU session 2 or IP address 2 (or IP prefix 2) of PDU session 2. As an example, the information related to PDU session modification request may include identification information of PDU session 2 for newly establishing the same based on UPF relocation.

According to various embodiments, the electronic device (for example, the processor 120 or 500) may identify the quality of experience (QoE) related to PDU session 1 allocated based on modification of the PDU session configured in SSC mode 3 and/or PDU session 2 in operation 1105. As an example, the QoE related to PDU session 1 and/or PDU session 2 may include at least one of a round trip time (RTT) in a case in which communication is performed using PDU session 1 and/or PDU session 2, path loss, or throughput. According to an embodiment, the processor 500 may determine that the time elapsed from a timepoint at which a transmission control protocol (TCP) synchronization signal is transmitted to a server related to an application program, based on IP address 1, to a timepoint at which an ACK of the TCP synchronization signal is received from the server is the RTT related to PDU session 1. The processor 500 may determine that the time elapsed from a timepoint at which a TCP synchronization signal is transmitted to a server related to an application program, based on IP address 2, to a timepoint at which an ACK of the TCP synchronization signal is received from the server is the RTT related to PDU session 2.

According to an embodiment, the processor 500 may determine that the time elapsed from a timepoint at which an initial packet related to QUIC is transmitted to a server related to an application program, based on IP address 1, to a timepoint at which an ACK of the initial packet is received is the RTT related to PDU session 1. The processor 500 may determine that the time elapsed from a timepoint at which an initial packet related to QUIC is transmitted to a server related to an application program, based on IP address 2, to a timepoint at which an ACK of the initial packet is received is the RTT related to PDU session 2.

According to an embodiment, the processor 500 may determine that the time elapsed from a timepoint at which a ping request signal of ICMP is transmitted using IP address 1 to a timepoint at which a ping ACK is received is the RTT related to PDU session 1. The processor 500 may determine that the time elapsed from a timepoint at which a ping request signal of ICMP is transmitted using IP address 2 to a timepoint at which a ping ACK is received is the RTT related to PDU session 2.

According to an embodiment, the RTT related to PDU session 1 and/or PDU session 2 may be determined as a combination of at least one of an RTT based on a TCP synchronization signal, an RTT based on an initial packet related to QUIC, or an RTT based on a ping request signal. For example, the RTT related to PDU session 1 and/or PDU session 2 may include an RTT in a case in which a server related to a foreground application program is accessed using PDU session 1 and/or PDU session 2. For example, the RTT related to PDU session 1 and/or PDU session 2 may include the average of RTTs in cases in which servers related to respective application programs executed in the electronic device 101 are accessed using PDU session 1 and/or PDU session 2.

According to an embodiment, the processor 500 may detect (or measure) the RTT related to PDU session 1 through a server related to an application program executed in the electronic device 101. The processor 500 may identify a server (or the IP address of the server) related to an application program to be accessed through IP address 2 through pre-resolving of a domain name system (DNS) based on allocation of IP address 2 (or IP prefix 2). The processor 500 may detect (or measure) the RTT related to PDU session 2 through a server related to an application program to be accessed through IP address 2 (or PDU session 2). As an example, the server related to an application program to be accessed through IP address 2 (or PDU session 2) may be identical to or different from the server related to an application program to be accessed through IP address 1 (or PDU session 1).

According to various embodiments, the electronic device (for example, the processor 120 or 500) may identify whether the QoE related to PDU session 1 and/or PDU session 2 satisfies a designated switching condition in operation 1107. According to an embodiment, the processor 500 may identify whether the designated switching condition is satisfied, based on the RTT related to PDU session 2 and the RTT related to PDU session 1 while the valid lifetime of PDU session 1 exists. For example, a state in which the designated switching condition is satisfied may include a state in which the difference between the RTT related to PDU session 2 and the RTT related to PDU session 1 is used is equal to/less than a designated first reference value. For example, a state in which the designated switching condition is not satisfied may include a state in which the difference between the RTT related to PDU session 2 and the RTT related to PDU session 1 exceeds the designated first reference value. As an example, a state in which the valid lifetime of PDU session 1 exists may include a state prior to expiration of the valid lifetime of PDU session 1. According to an embodiment, the processor 500 may identify whether the designated switching condition is satisfied, based on packet loss related to PDU session 1 while the valid lifetime of PDU session 1 exists. For example, a state in which the designated switching condition is satisfied may include a state in which the packet loss related to PDU session 1 exceeds designated reference loss. For example, a state in which the designated switching condition is not satisfied may include a state in which the packet loss related to PDU session 1 is equal to/less than the designated reference loss.

According to various embodiments, if the QoE related to PDU session 1 and/or PDU session 2 does not satisfy the designated switching condition ("No" in operation 1107), the electronic device (for example, the processor 120 or 500) may end data path switching. According to an embodiment, the processor 500 may determine that the quality of data communication of PDU session 1 is better than that of PDU session 2 if the QoE related to PDU session 1 and/or PDU session 2 while the valid lifetime of PDU session 1 exists does not satisfy the designated switching condition. The processor 500 may maintain the data path to PDU session 1. According to an embodiment, the processor 500 may switch the data path to PDU session 2 if the valid lifetime of PDU session 1 expires.

According to various embodiments, if the QoE related to PDU session 1 and/or PDU session 2 satisfies the designated switching condition ("Yes" in operation 1107), the electronic device (for example, the processor 120 or 500) may switch the data path to PDU session 2 in operation 1109. According to an embodiment, the processor 500 may determine that the quality of data communication of PDU session 2 is better than that of PDU session 1, or that the quality of data communication of PDU session 1 is similar to that of PDU session 2, if the QoE related to PDU session 1 and/or PDU session 2 while the valid lifetime of PDU session 1 exists satisfies the designated switching condition. The processor 500 may switch the data path to IP address 2 of the PDU session while the valid lifetime of IP address 1 of the PDU session exists.

According to an embodiment, the processor 500 may update the valid lifetime of PDU session 1, based on switching of the data path to PDU session 2. For example, the processor 500 may reduce the valid lifetime of PDU session 1 with reference to a designated interval. For example, the processor 500 may repeatedly update the valid lifetime of PDU session 1 if the valid lifetime of PDU session 1 exists. For example, the processor 500 may release PDU session if the valid lifetime of PDU session 1 expires. As an example, the designated interval may include half the valid lifetime (for example, remaining valid lifetime) of PDU session 1 or a fixed interval, as a reference range for reducing the valid lifetime (for example, remaining valid lifetime) of PDU session 1 at once.

According to various embodiments, the electronic device (for example, the processor 120 or 500) may perform data communication through PDU session 2 in operation 1111.

Figure 12:
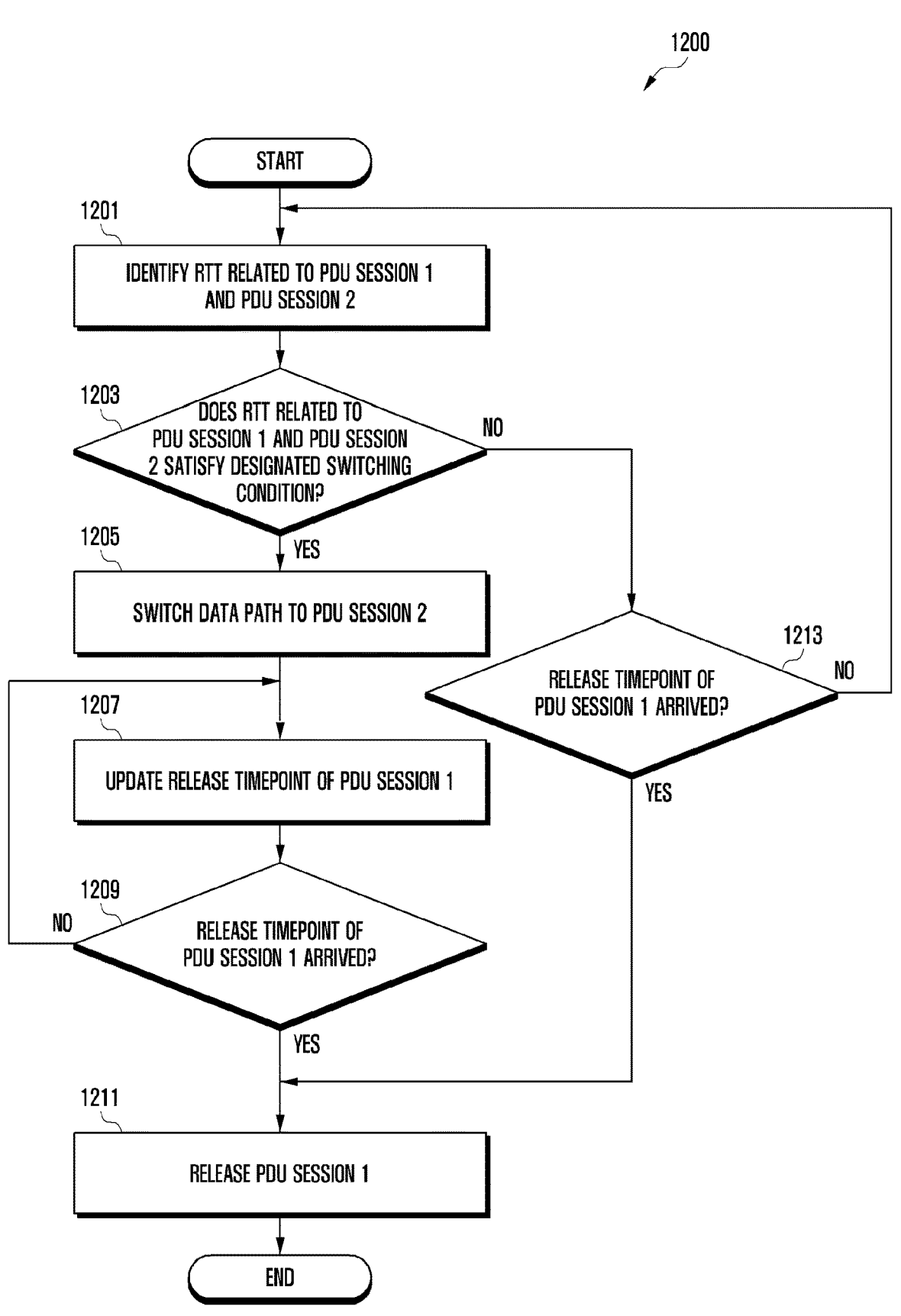
FIG. 12 is a flowchart illustrating an example method for configuring a timepoint to switch a data path, based on an RTT, in an electronic device according to various embodiments.

FIG. 12 is a flowchart 1200 illustrating an example method for configuring a timepoint to switch a data path, based on an RTT, in an electronic device according to various embodiments. According to an embodiment, at least a part of FIG. 12 may include detailed descriptions of operation 1105 to operation 1111 in FIG. 11. In the following example, respective operations may be performed successively, but are not necessarily performed successively. For example, the order of respective operations may be changed, and at least two operations may be performed in parallel. As an example, the electronic device in FIG. 12 may be the electronic device 101 in FIG. 1, FIG. 2, FIG. 3, FIG. 4, or FIG. 5.

According to various embodiments referring to FIG. 12, the electronic device (for example, the processor 120 in FIG. 1 or the processor 500 in FIG. 5) may identify an RTT related to PDU session 1 and PDU session 2 in operation 1201 in a case in which PDU session 1 and PDU session 2 have been allocated based on modification of a PDU session configured in SSC mode 3 (for example, operation 1103 in FIG. 11). According to an embodiment, the processor 500 may detect (or measure) the RTT in a case in which PDU session 1 and/or PDU session 2 are used to access a server related to a foreground application program among application programs executed in the electronic device 101. As an example, the foreground application program may indicate a reference application program having a graphic user interface (GUI) displayed at the top end of the display (not illustrated) of the electronic device 101 among application programs executed in the electronic device 101.

According to an embodiment, the processor 500 may detect (or measure) the RTT in cases in which PDU session 1 and/or PDU session 2 are used to access servers related to application programs executed in the electronic device 101. As an example, application programs executed in the electronic device 101 may include an application program having an open (or activated) socket for transmitting and/or receiving messages of the application program.

According to an embodiment, the RTT related to PDU session 1 and/or PDU session 2 may be determined (or measured) based on at least one of a TCP synchronization signal to an application program, an initial packet related to QUIC, or a ping request signal.

According to an embodiment, the processor 500 may detect (or measure) the RTT related to PDU session 1 through a server related to an application program executed in the electronic device 101. The processor 500 may identify a server (or the IP address of the server) related to an application program to be accessed through IP address 2 (or PDU session 2) through DNS pre-resolving based on allocation of IP address 2 (or IP prefix 2). The processor 500 may detect (or measure) the RTT related to PDU session 2 through a server related to an application program to be accessed through IP address 2 (or IP prefix 2).

According to various embodiments, the electronic device (for example, the processor 120 or 500) may identify whether the RTT related to PDU session 1 and PDU session 2 satisfies a designated switching condition in operation 1203. According to an embodiment, the processor 500 may identify whether a designated switching condition is satisfied, based on the RTT related to PDU session 2 and the RTT related to PDU session 1, while the valid lifetime of PDU session 1 exists. For example, a state in which the designated switching condition is satisfied may include a state in which the difference between the RTT related to PDU session 2 and the RTT related to PDU session 1 is used is equal to/less than a designated first reference value. For example, a state in which the designated switching condition is not satisfied may include a state in which the difference between the RTT related to PDU session 2 and the RTT related to PDU session 1 exceeds the designated first reference value. As an example, a state in which the valid lifetime of PDU session 1 exists may include a state prior to expiration of the valid lifetime of PDU session 1.

According to various embodiments, if the RTT related to PDU session 1 and PDU session 2 satisfies the designated switching condition (for example, "Yes" in operation 1203), the electronic device (for example, the processor 120 or 500) may switch the data path to PDU session 2 in operation 1205. According to an embodiment, the processor 500 may determine that the quality of data communication of PDU session 2 is better than that of PDU session 1, or that the quality of data communication of PDU session 1 is similar to that of PDU session 2, if the RTT related to PDU session 1 and PDU session 2 satisfies the designated switching condition while the valid lifetime of PDU session 1 exists. The processor 500 may switch the data path to PDU session 2 while the valid lifetime of PDU session 1 exists. The processor 500 may control the communication circuit 510 so as to perform data communication through PDU session 2, based on data path switching.

According to various embodiments, the electronic device (for example, the processor 120 or 500) may update the valid lifetime (or release timepoint) of PDU session 1 in operation 1207. According to an embodiment, the processor 500 may reduce the valid lifetime of PDU session 1 with reference to a designated interval. According to various embodiments, the electronic device (for example, the processor 120 or 500) may identify whether the updated valid lifetime (or termination timepoint) of PDU session 1 arrives in operation 1209.

According to various embodiments, if the updated valid lifetime (or termination timepoint) of PDU session 1 has not arrived (for example, "No" in operation 1209), the electronic device (for example, the processor 120 or 500) may update the valid lifetime (or release timepoint) of PDU session 1 in operation 1207. According to an embodiment, the processor 500 may repeatedly update the valid lifetime of PDU session 1 if the valid lifetime of PDU session 1 exists. As an example, the valid lifetime of PDU session 1 may be updated based on a designated period.

According to various embodiments, if the updated valid lifetime (or termination timepoint) of PDU session 1 has arrived (for example, "Yes" in operation 1209), the electronic device (for example, the processor 120 or 500) may release PDU session 1 in operation 1211. According to an embodiment, the processor 500 may release PDU session 1 by closing the socket of the application program related to PDU session 1. As an example, a state in which the valid lifetime (or updated valid lifetime) of PDU session 1 arrives may include a state in which the valid lifetime of PDU session 1 is equal to/less than a designated minimum valid lifetime.

According to various embodiments, if the RTT related to PDU session 1 and PDU session 2 does not satisfy the designated switching condition (for example, "No" in operation 1203), the electronic device (for example, the processor 120 or 500) may identify whether the valid lifetime (or termination/release timepoint) of PDU session 1 arrives in operation 1213. According to an embodiment, if the RTT related to PDU session 1 and PDU session 2 does not satisfy the designated switching condition while the valid lifetime PDU session 1 exists, the processor 500 may maintain the data path to PDU session 1.

According to various embodiments, if the valid lifetime (or termination timepoint) of PDU session 1 has not arrived (for example, "No" in operation 1213), the electronic device (for example, the processor 120 or 500) may identify the RTT related to PDU session 1 and PDU session 2 in operation 1201. According to an embodiment, if the data path of PDU session 1 is maintained while the valid lifetime of PDU session 1 exists, the processor 500 may identify and compare the RTT related to PDU session 1 and PDU session 2, based on a designated period, thereby identifying whether it is possible to switch the data path to PDU session 2.

According to an embodiment, if the number of times it is identified whether to switch the data path while the valid lifetime of PDU session 1 exists exceeds a designated number of times, the processor 500 may switch the data path to PDU session 2.

According to an embodiment, if transmission and reception of data based on PDU session 1 do not exist during a designated first reference time while the valid lifetime of PDU session 1 exists, the processor 500 may switch the data path to PDU session 2.

According to various embodiments, if the valid lifetime (or termination timepoint) of PDU session 1 has arrived (for example, "Yes" in operation 1213), the electronic device (for example, the processor 120 or 500) may release PDU session 1 in operation 1211. According to an embodiment, if the valid lifetime of PDU session 1 expires, the processor 500 may switch the data path to PDU session 2.

Figure 13:
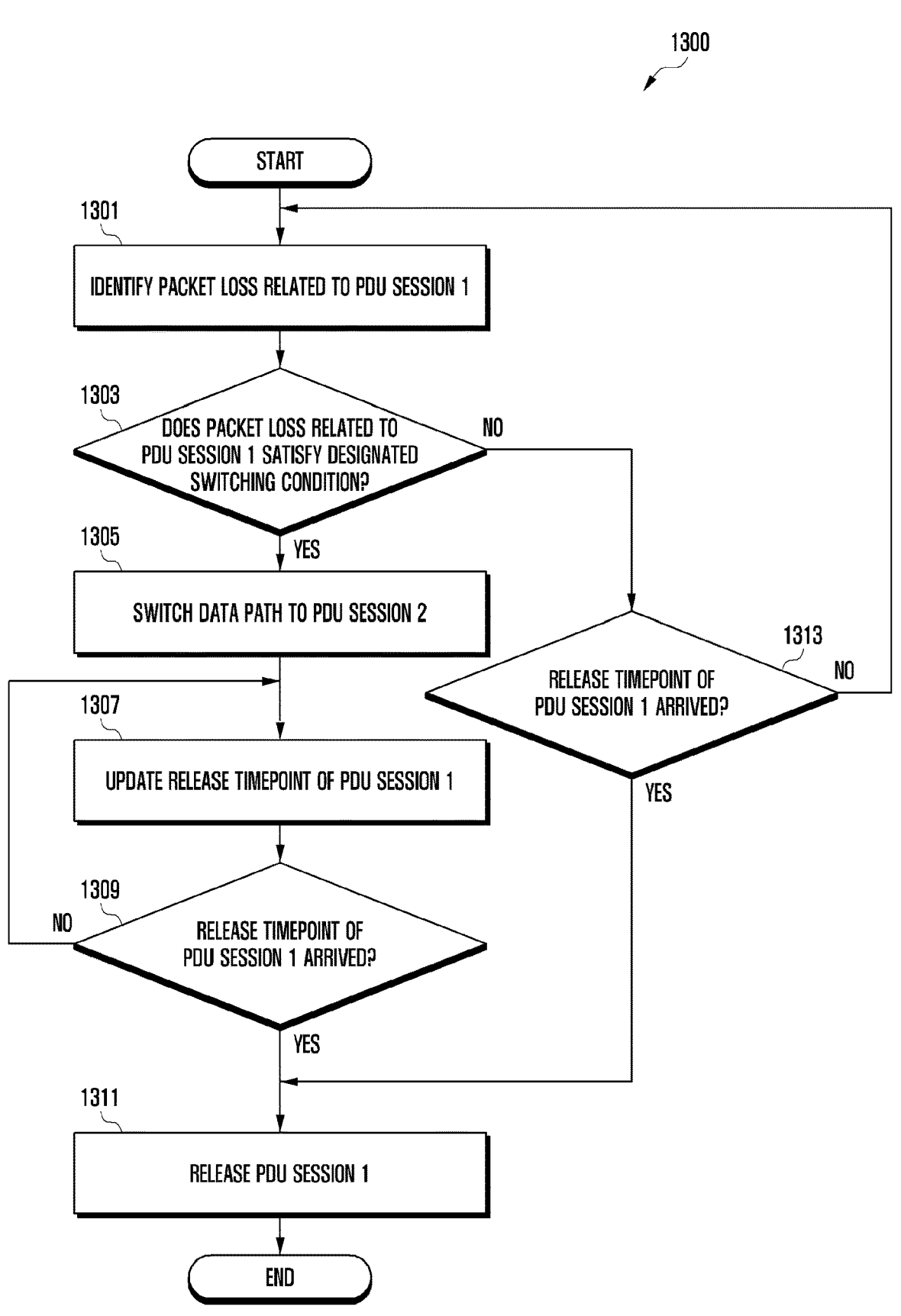
FIG. 13 is a flowchart illustrating an example method for configuring a timepoint to switch a data path, based on packet loss, in an electronic device according to various embodiments.

FIG. 13 is a flowchart 1300 illustrating an example method for configuring a timepoint to switch a data path, based on packet loss, in an electronic device according to various embodiments. According to an embodiment, at least a part of FIG. 13 may include detailed descriptions of operation 1105 to operation 1111 in FIG. 11. In the following example, respective operations may be performed successively, but are not necessarily performed successively. For example, the order of respective operations may be changed, and at least two operations may be performed in parallel. As an example, the electronic device in FIG. 13 may be the electronic device 101 in FIG. 1, FIG. 2, FIG. 3, FIG. 4, or FIG. 5.

According to various embodiments referring to FIG. 13, the electronic device (for example, the processor 120 in FIG. 1 or the processor 500 in FIG. 5) may identify packet loss related to PDU session 1 in operation 1301 in a case in which PDU session 1 and PDU session 2 are allocated based on modification of a PDU session configured in SSC mode 3 (for example, operation 1103 in FIG. 11). According to an embodiment, the processor 500 may identify the ratio of loss of data (packet) transmitted and/or received based on PDU session 1 during a designated time.

According to various embodiments, the electronic device (for example, the processor 120 or 500) may identify whether the packet loss related to PDU session 1 satisfies a designated switching condition in operation 1303. According to an embodiment, the processor 500 may determine that the designated switching condition is satisfied if the packet loss related to PDU session 1 while the valid lifetime of PDU session 1 exists exceeds designated reference loss. According to an embodiment, the processor 500 may determine that the designated switching condition is not satisfied if the packet loss related to PDU session 1 while the valid lifetime of related to PDU session 1 exists is equal to/less than the designated switching condition. As an example, a state in which the valid lifetime of related to PDU session 1 exists may include a state prior to expiration the valid lifetime of PDU session 1.

According to various embodiments, if the packet loss related to PDU session 1 satisfies the designated switching condition (for example, "Yes" in operation 1303), the electronic device (for example, the processor 120 or 500) may switch the data path to PDU session 2 in operation 1305. According to an embodiment, the processor 500 may determine that the quality of data communication of PDU session 1 is relatively degraded if the packet loss related to PDU session 1 while the valid lifetime of PDU session 1 exists satisfies the designated switching condition. The processor 500 may switch the data path to PDU session 2 while the valid lifetime of PDU session 1 exists. The processor 500 may control the communication circuit 510 so as to perform data communication through PDU session 2, based on data path switching.

According to various embodiments, the electronic device (for example, the processor 120 or 500) may update the valid lifetime (or release timepoint) of PDU session 1 in operation 1307. According to an embodiment, the processor 500 may reduce the valid lifetime of PDU session 1 with reference to a designated interval.

According to various embodiments, the electronic device (for example, the processor 120 or 500) may identify whether the updated valid lifetime (or termination/release timepoint) of PDU session 1 arrives in operation 1309.

According to various embodiments, if the updated valid lifetime (or termination timepoint) of PDU session 1 has not arrived (for example, "No" in operation 1309), the electronic device (for example, the processor 120 or 500) may update the valid lifetime (or release timepoint) of PDU session 1 in operation 1307. According to an embodiment, the processor 500 may repeatedly update the valid lifetime of PDU session 1 if the valid lifetime of PDU session 1 exists. As an example, the valid lifetime of PDU session 1 may be updated based on a designated period.

According to various embodiments, if the updated valid lifetime (or termination timepoint) of PDU session 1 has arrived (for example, "Yes" in operation 1309), the electronic device (for example, the processor 120 or 500) may release PDU session 1 in operation 1311. As an example, releasing IP PDU session 1 may include a series of operations in which the socket of the application program related to PDU session 1 is closed.

According to various embodiments, if the packet loss related to PDU session 1 does not satisfy the designated switching condition (for example, "No" in operation 1303), the electronic device (for example, the processor 120 or 500) may identify whether the valid lifetime (or termination/ release timepoint) of PDU session 1 arrives in operation 1313. According to an embodiment, if the packet loss related to PDU session 1 while the valid lifetime of PDU session 1 exists does not satisfy the designated switching condition, the processor 500 may maintain the data path to PDU session 1.

According to various embodiments, if the valid lifetime (or termination timepoint) of PDU session 1 has not arrived (for example, "No" in operation 1313), the electronic device (for example, the processor 120 or 500) may identify the packet loss related to PDU session 1 in operation 1301. According to an embodiment, if the data path of PDU session 1 is maintained while the valid lifetime of PDU session 1 exists, the processor 500 may identify whether the packet loss related to PDU session 1 satisfies the designated switching condition, based on a designated period, thereby identifying whether it is possible to switch the data path to PDU session 2.

According to an embodiment, if the number of times it is identified whether to switch the data path while the valid lifetime of PDU session 1 exists exceeds a designated number of times, the processor 500 may switch the data path to PDU session 2.

According to an embodiment, if transmission and reception of data based on PDU session 1 do not exist during a designated first reference time while the valid lifetime of PDU session 1 exists, the processor 500 may switch the data path to PDU session 2.

According to various embodiments, if the valid lifetime (or termination timepoint) of PDU session 1 has arrived (for example, "Yes" in operation 1313), the electronic device (for example, the processor 120 or 500) may release PDU session 1 in operation 1311. According to an embodiment, if the valid lifetime of PDU session 1 expires, the processor 500 may switch the data path to PDU session 2.

Figure 14:
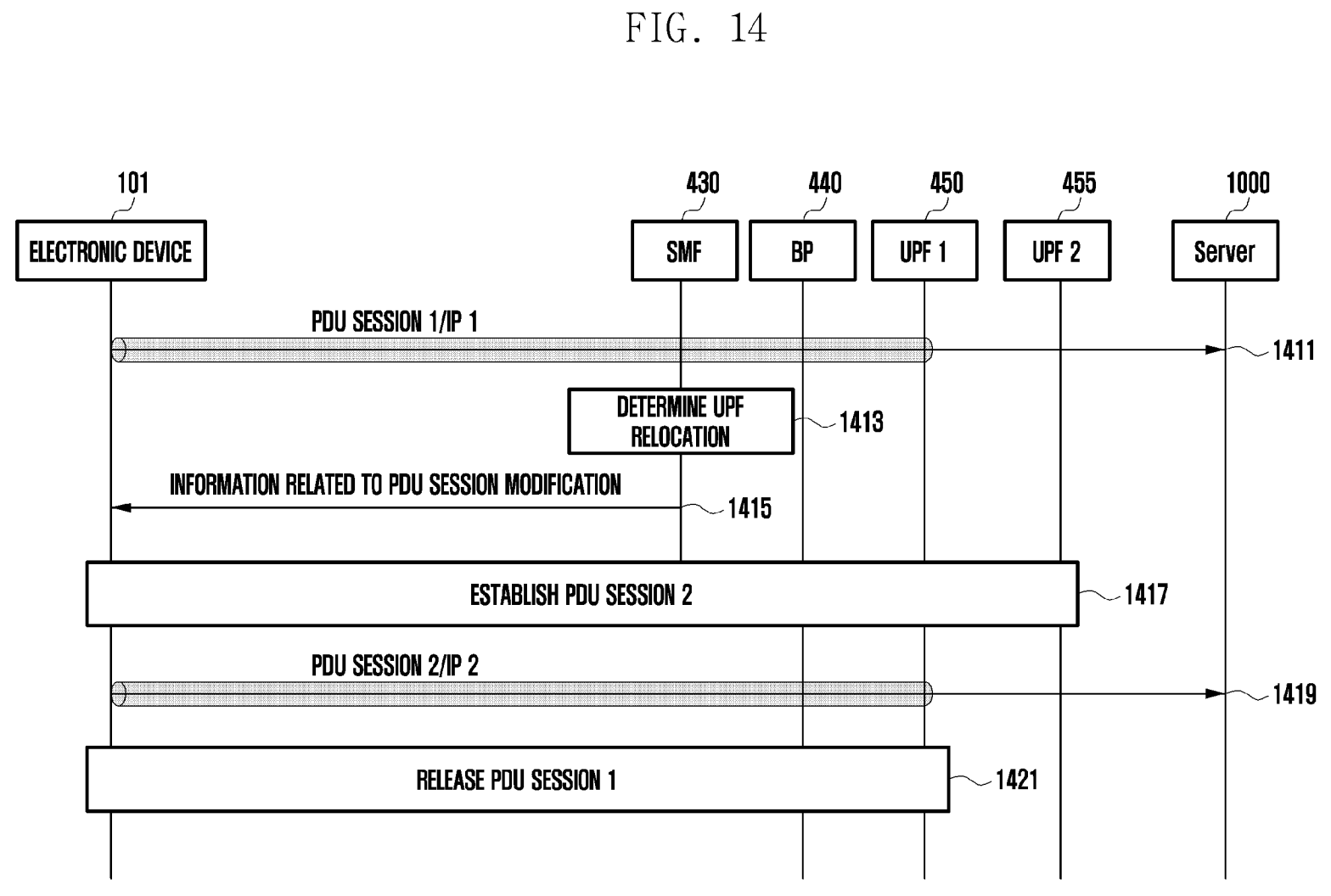

FIG. 14 is a signal flow diagram illustrating an example method for modifying a data path using single-homing in an electronic device according to various embodiments.

According to various embodiments referring to FIG. 14, the electronic device 101 may perform data communication with a server through UPF 1 450, based on protocol data unit (PDU) session 1 configured in SSC mode 3 and IP address 1 (operation 1411). According to an embodiment, the electronic device 101 may establish PDU session 1 with UPF 1 450 based on IP address 1. The electronic device 101 may perform data communication with the server through UPF 1 450 (operation 1411). For example, the electronic device 101 may use IP address 1 as the source IP of IP communication in the case of access routing to PDU session 1.

According to various embodiments, the SMF 430 may determine relocation of the UPF, based on at least one of the position of the electronic device 101, load of the UPF 1 450, connection information of a base station (for example, RAN 410), or requirement of an application program executed in the electronic device 101 (operation 1413). According to an embodiment, the SMF 430 may determine relocation of the UPF upon determining that the PDU session with the electronic device 101 can use a relatively short data transmission path if UPF 1 450 is relocated to another UPF (for example, UPF 2 455), or that the reduced data arrival time benefits the electronic device 101 and/or the network operator.

According to various embodiments, upon determining relocation of the UPF (operation 1413), the SMF 430 may transmit information (for example, PDU session modification command) related to PDU session modification to the electronic device 101 (operation 1415). As an example, the information related to PDU session modification may include the valid lifetime of IP address 1 (or IP prefix 1) of PDU session 1, PDU session 2, or information related to IP address 2 (or IP prefix 2) of PDU session 2.

According to various embodiments, the electronic device 101 may establish PDU session 2 based on receiving information related to PDU session modification from the network (operation 1417). According to an embodiment, the electronic device 101 may transmit a response message (for example, PDU session modification complete) regarding the information related to PDU session modification to the network. The electronic device 101 may transmit information (for example, PDU session modification request) related to a PDU session modification request to the network in order to establish a new PDU session. The electronic device 101 may determine that establishment of PDU session 2 configured in SSC mode 3 is completed, based on an ACK regarding the information related to a PDU session modification request received from the network.

According to various embodiments, the electronic device 101 may switch the data path to PDU session 2 (operation 1419). According to an embodiment, the electronic device 101 may identify the quality of experience (QoE) related to PDU session 1 established based on modification of the PDU session configured in SSC mode 3 and/or PDU session 2. The electronic device 101 may switch the data path to PDU session 2 upon determining that the QoE related to PDU session 1 and/or PDU session 2 satisfies a designated switching condition. As an example, the QoE may include at least one of a round trip time (RTT) in a case in which communication is performed using PDU session 1 and/or PDU session 2, path loss, or throughput.

According to an embodiment, upon determining that the QoE related to PDU session 1 and/or PDU session 2 does not satisfy the designated switching condition, the electronic device 101 may identify the QoE related to PDU session 1 and/or PDU session 2, based on a designated period, thereby identifying whether the designated switching condition is satisfied. If the number of times it is identified whether the data path is switched while the valid lifetime of PDU session 1 exists exceeds a designated number of times, the electronic device 101 may switch the data path to PDU session 2.

According to an embodiment, the electronic device 101 may switch the data path to PDU session 2 if transmission and reception of data based on PDU session 1 do not exist during a designated first reference time while the valid lifetime of PDU session 1 exists.

According to various embodiments, the electronic device 101 may release PDU session 1 if the valid lifetime of PDU session 1 expires (operation 1421). According to an embodiment, the electronic device 101 may update the valid lifetime of PDU session 1, based on switching of the data path to PDU session 2. For example, the processor 500 may reduce the valid lifetime of PDU session 1 with reference to a designated interval. For example, if the valid lifetime of PDU session 1 exists, the processor 500 may repeatedly update the valid lifetime of PDU session 1. According to an embodiment, the electronic device 101 may release PDU session 1 if the updated valid lifetime of PDU session 1 expires.

Figure 15:
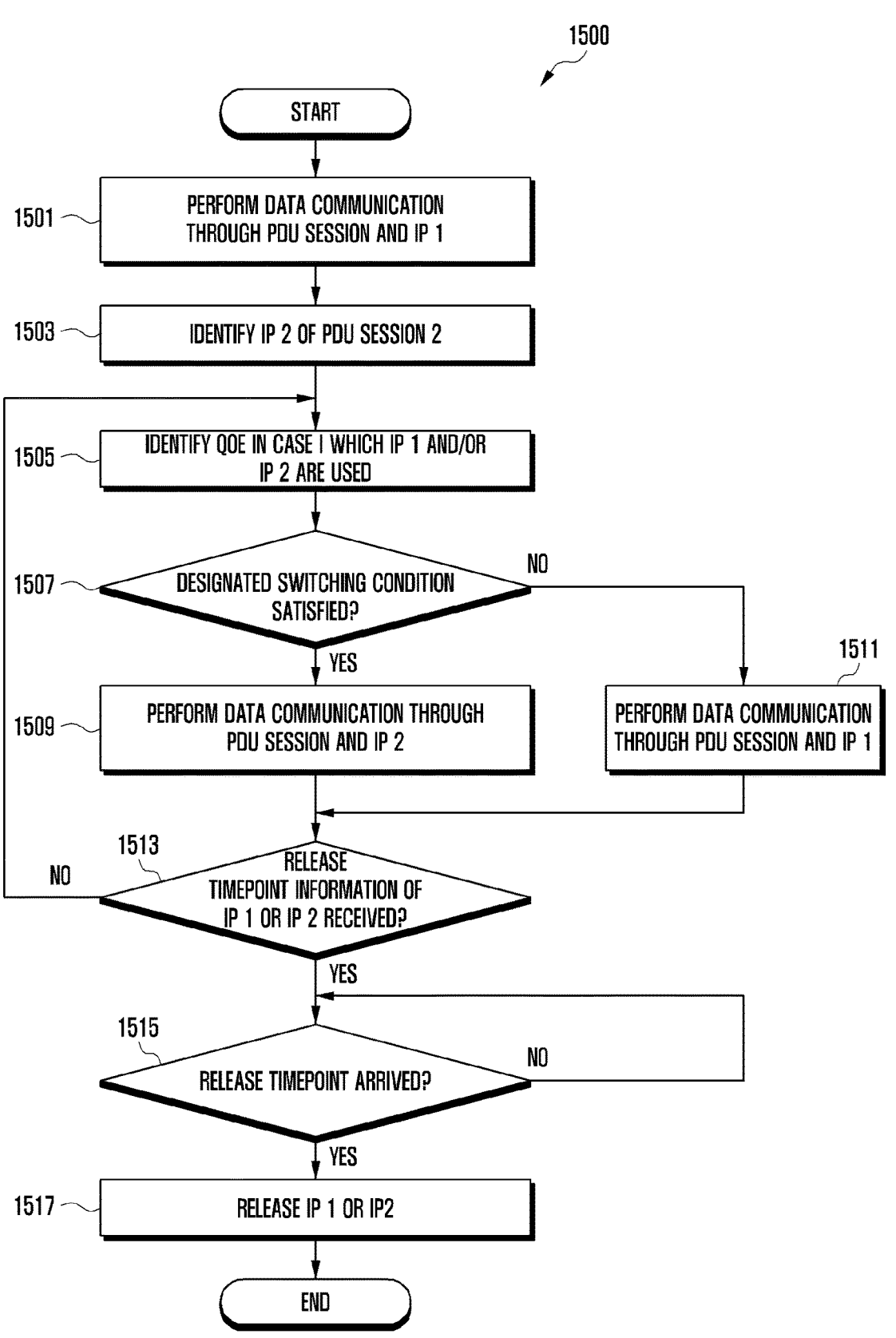
FIG. 15 is a flowchart illustrating an example method for modifying a data path in an electronic device according to various embodiments.

FIG. 15 is a flowchart 1500 illustrating an example method for modifying a data path in an electronic device according to various embodiments. In the following example, respective operations may be performed successively, but are not necessarily performed successively. For example, the order of respective operations may be changed, and at least two operations may be performed in parallel. As an example, the electronic device in FIG. 15 may be the electronic device 101 in FIG. 1, FIG. 2, FIG. 3, FIG. 4, or FIG. 5.

According to various embodiments referring to FIG. 15, the electronic device (for example, the processor 120 in FIG. 1 or the processor 500 in FIG. 5) may perform data communication based on a protocol data unit (PDU) session configured in SSC mode 3 and IP address 1 allocated from a network in operation 1501. According to an embodiment, the processor 500 may control the communication circuit 510 so as to transmit a message related to a request for access to a server (or content server) to a network (for example, the RAN 410 in FIG. 4), based on the occurrence of an event related to data communication. According to an embodiment, the processor 500 may control the communication circuit 510 so as to establish a PDU session for data communication, based on control information received from the network in response to transmission of the access request-related message.

According to various embodiments, the electronic device (for example, the processor 120 or 500) may identify IP address 2 newly allocated to the PDU session by the network, based on relocation of the UPF related to the PDU session, in operation 1503. According to an embodiment, the processor 500 may determine that UPF has been relocated, based on receiving information related to IP prefix 1 having a preferred lifetime configured as a first value (for example, "0") and information related to IP prefix 2 from the network through the communication circuit 510, in the case of multi-homing. The processor 500 may generate IP address 2 of the PDU session based on IP prefix 2 received from the network.

According to various embodiments, the electronic device (for example, the processor 120 or 500) may identify the quality of experience (QoE) in a case in which communication is performed using IP address 1 and/or IP address 2 of the PDU session configured in SSC mode 3, in operation 1505. As an example, the QoE may include at least one of a round trip time (RTT), path loss, or throughput. According to an embodiment, the processor 500 may determine that the time elapsed from a timepoint at which a transmission control protocol (TCP) synchronization signal is transmitted to a server related to an application program, based on IP address 1, to a timepoint at which an ACK of the TCP synchronization signal is received from the server is the RTT in a case in which IP address 1 is used. The processor 500 may determine that the time elapsed from a timepoint at which a TCP synchronization signal is transmitted to a server related to an application program, based on IP address 2, to a timepoint at which an ACK of the TCP synchronization signal is received from the server is the RTT in a case in which IP address 2 is used. According to an embodiment, the processor 500 may determine that the time elapsed from a timepoint at which an initial packet related to QUIC is transmitted to a server related to an application program, based on IP address 1, to a timepoint at which an ACK of the initial packet is received is the RTT in a case in which IP address 1 is used. The processor 500 may determine that the time elapsed from a timepoint at which an initial packet related to QUIC is transmitted to a server related to an application program, based on IP address 2, to a timepoint at which an ACK of the initial packet is received is the RTT in a case in which IP address 2 is used. According to an embodiment, the processor 500 may determine that the time elapsed from a timepoint at which a ping request signal of ICMP is transmitted using IP address 1 to a timepoint at which a ping ACK is received is the RTT in a case in which IP address 1 is used. The processor 500 may determine that the time elapsed from a timepoint at which a ping request signal of ICMP is transmitted using IP address 2 to a timepoint at which a ping ACK is received is the RTT in a case in which IP address 2 is used. According to an embodiment, the RTT in a case in which IP address 1 and/or IP address 2 are used may be determined as a combination of at least one of an RTT based on a TCP synchronization signal, an RTT based on an initial packet related to QUIC, or an RTT based on a ping request signal. For example, the RTT in a case in which IP address 1 and/or IP address 2 are used may include an RTT in a case in which IP address 1 and/or IP address 2 are used based on a foreground application program among application programs executed in the electronic device 101. For example, the RTT in a case in which IP address 1 and/or IP address 2 are used may include the average of RTTs in cases in which IP address 1 and/or IP address 2 application programs executed in the electronic device 101 are used.

According to an embodiment, the processor 500 may detect (or measure) the RTT in cases in which IP address 1 is used through a server related to an application program executed in the electronic device 101. The processor 500 may identify a server (or the IP address of the server) related to an application program to be accessed through IP address 2 through DNS pre-resolving based on allocation of IP address 2 (or IP prefix 2). The processor 500 may detect (or measure) the RTT in cases in which IP address 2 is used through a server related to an application program to be accessed through IP address 2. As an example, the server related to an application program to be accessed through IP address 2 may be identical to or different from the server related to an application program to be accessed through IP address 1.

According to various embodiments, the electronic device (for example, the processor 120 or 500) may identify whether the QoE in a case in which communication is performed using IP address 1 and/or IP address 2 satisfies a designated switching condition in operation 1507. According to an embodiment, in a case in which no valid lifetime of IP address 1 of the PDU session is configured, the processor 500 may selectively use IP address 1 or IP address 2, based on the QoE in a case in which communication is performed using IP address 1 and/or IP address 2. For example, the state in which no valid lifetime of IP address 1 of the PDU session is configured may be identified through a PCO message received from the network. For example, the state in which no valid lifetime of IP address 1 of the PDU session is configured may be identified based on a case in which the valid lifetime of IP address 1 of the PDU session has a designated value (for example, "−1").

The processor 500 may identify whether the designated switching condition is satisfied, based on the RTT in a case in which IP address 2 is used and the RTT in a case in which IP address 1 is used while the valid lifetime of IP address 1 exists. For example, a state in which the designated switching condition is satisfied may include a state in which the difference between the RTT in a case in which IP address 2 is used and the RTT in a case in which IP address 1 is used is equal to/less than a designated first reference value. For example, a state in which the designated switching condition is not satisfied may include a state in which the difference between the RTT in a case in which IP address 2 is used and the RTT in a case in which IP address 1 is used exceeds the designated first reference value. As an example, a state in which the valid lifetime of IP address 1 of the PDU session exists may include a state prior to expiration of IP address 1 of the PDU session. According to an embodiment, the processor 500 may identify whether the designated switching condition is satisfied, based on packet loss in a case in which IP address 1 is used while the valid lifetime of IP address 1 exists. For example, a state in which the designated switching condition is satisfied may include a state in which the packet loss in a case in which IP address 1 is used exceeds designated reference loss. For example, a state in which the designated switching condition is not satisfied may include a state in which the packet loss in a case in which IP address 1 is used is equal to/less than the designated reference loss.

According to various embodiments, if the QoE in a case in which communication is performed using IP address 1 and/or IP address 2 satisfies the designated switching condition ("Yes" in operation 1507), the electronic device (for example, the processor 120 or 500) may perform data communication based on IP address 2 of the PDU session in operation 1509. According to an embodiment, if the QoE in a case in which communication is performed using IP address 1 and/or IP address 2 satisfies the designated switching condition, the processor 500 may determine that the quality of data communication of IP address 2 is better than that of IP address 1 or that the quality of data communication of IP address 1 is similar to that of IP address 2. For example, in a case in which the data path is configured at IP address 1 of the PDU session, the processor 500 may control the communication circuit 510 so as to switch the data path to IP address 2 of the PDU session such that data communication is performed based on IP address 2 of the PDU session. For example, in a case in which the data path is configured at IP address 2 of the PDU session, the processor 500 may control the communication circuit 510 so as to perform data communication through the data path of IP address 2 of the PDU session.

According to various embodiments, if the QoE in a case in which communication is performed using IP address 1 and/or IP address 2 does not satisfy the designated switching condition ("No" in operation 1507), the electronic device (for example, the processor 120 or 500) may perform data communication based on IP address 1 of the PDU session in operation 1511. According to an embodiment, if the QoE in a case in which communication is performed using IP address 1 and/or IP address 2 does not satisfy the designated switching condition, the processor 500 may determine that the quality of data communication of IP address 1 is better than that of IP address 2. The processor 500 may control the communication circuit 510 so as to perform data communication through the data path of IP address 1 of the PDU session. For example, in a case in which the data path is configured at IP address 1 of the PDU session, the processor 500 may control the communication circuit 510 so as to switch the data path to IP address 1 of the PDU session such that data communication is performed based on IP address 1 of the PDU session.

According to various embodiments, the electronic device (for example, the processor 120 or 500) may identify whether release timepoint information of IP address 1 or IP address 2 is received from the network in operation 1513. According to an embodiment, the processor 500 may identify whether a router advertisement (RA) message including release timepoint information of IP address 1 or IP address 2 is received from the network in a state in which IP address 1 and IP address 2 of the PDU session are allocated. As an example, the release timepoint information of IP address 1 or IP address 2 may include information having a preferred lifetime of a specific IP address (or IP prefix) (for example, IP address 1 or IP address 2) configured as a first value (for example, "0"), and having a valid lifetime configured as a second value different from the first value.

According to various embodiments, if no release timepoint information of IP address 1 or IP address 2 has been received from the network (for example, "No" in operation 1513), the electronic device (for example, the processor 120 or 500) may identify the QoE in a case in which communication is performed using IP address 1 and/or IP address 2 of the PDU session in operation 1505. According to an embodiment, if no release timepoint information of IP address 1 or IP address 2 has been received from the network, the processor 500 may determine that IP address 1 or IP address 2 of the PDU session can be used selectively. The processor 500 may identify the QoE in a case in which communication is performed using IP address 1 and/or IP address 2 of the PDU session in order to select IP address 1 or IP address 2 of the PDU session.

According to various embodiments, if release timepoint information of IP address 1 or IP address 2 has been received from the network (for example, "Yes" in operation 1513), the electronic device (for example, the processor 120 or 500) may identify whether a release timepoint of a specific IP address (for example, IP address 1 or IP address 2) received from the network arrives in operation 1515. As an example, the release timepoint of a specific IP address (for example, IP address 1 or IP address 2) may be determined based on an expiration timepoint of the valid lifetime of the specific IP address.

According to various embodiments, if the release timepoint of a specific IP address (for example, IP address 1 or IP address 2) received from the network has not arrived (for example, "No" in operation 1515), the electronic device (for example, the processor 120 or 500) may again identify whether the release timepoint of a specific IP address (for example, IP address 1 or IP address 2) received from the network arrives in operation 1515.

According to various embodiments, if the release timepoint of a specific IP address (for example, IP address 1 or IP address 2) received from the network has arrived (for example, "Yes" in operation 1515), the electronic device (for example, the processor 120 or 500) may release the specific IP address (for example, IP address 1 or IP address 2) in operation 1517. According to an embodiment, the processor 500 may use a data path of another IP address (for example, IP address 2 or IP address 1) different from the specific IP address, based on releasing the specific IP address (for example, IP address 1 or IP address 2).

According to various embodiments, in a case in which no valid lifetime of IP address 1 of PDU session 1 is configured in the case of single-homing, the electronic device 101 may selectively use the data path of PDU session 1 or PDU session 2, based on the QoE related to PDU session 1 and/or PDU session 2. According to an embodiment, the processor 500 may identify the case in which no valid lifetime of IP address 1 of PDU session 1 is configured through a PCO message received from the network. According to an embodiment, the processor 500 may determine that no valid lifetime of IP address 1 of PDU session 1 is configured if the valid lifetime of IP address 1 of PDU session 1 received from the network has a designated value (for example, "-1").

According to various example embodiments, a method for operating an electronic device (for example, the electronic device 101 in FIG. 1, FIG. 2, FIG. 3, FIG. 4, or FIG. 5) may include performing data communication through a PDU session and IP address 1. According to an example embodiment, the method for operating an electronic device may include identifying IP address 2 of the PDU session related to modification of a data path. According to an example embodiment, the method for operating an electronic device may include identifying an RTT in which IP address 1 is used and an RTT in which IP address 2 is used, in a state in which IP address 1 and IP address 2 of the PDU session are allocated. According to an example embodiment, the method for operating an electronic device may include modifying the data path to IP address 2, based on a result of comparing the RTT in which IP address 1 is used and the RTT in which IP address 2 is used, prior to expiration of a valid lifetime of IP address 1. According to an example embodiment, the method for operating an electronic device may include releasing IP address 1 based on modification of the data path to IP address 2.

According to various example embodiments, the identifying an RTT may include identifying the RTT in which IP address 1 is used and the RTT in which IP address 2 is used, in a state in which IP address 1 and IP address 2 of the PDU session are allocated, based on being configured with a network in session and service continuity (SSC) mode 3.

According to various example embodiments, the performing data communication may include: transmitting a message related to an access request to a network, establishing a PDU session configured in SSC mode 3, based on information related to SSC mode 3 included in information related to PDU establishment acceptance received from the network, and performing data communication through the PDU session configured in SSC mode 3.

According to various example embodiments, the identifying an RTT may include identifying the RTT in which IP address 1 is used and the RTT in which IP address 2 is used through a server related to a reference application program among multiple application programs currently executed in the electronic device.

According to various example embodiments, the identifying an RTT may include identifying the RTT in which IP address 1 is used and the RTT in which IP address 2 is used through at least one server related to each of multiple application programs currently executed in the electronic device.

According to various example embodiments, the RTT in which IP address 1 or IP address 2 is used may include at least one of a time elapsed from a timepoint at which a TCP synchronization signal is transmitted to a server related to an application program currently executed in the electronic device, based on IP address 1 or IP address 2, to a timepoint at which an ACK of the TCP synchronization signal is received, a time elapsed from a timepoint at which an initial packet related to QUIC is transmitted to a server related to an application program currently executed in the electronic device, based on IP address 1 or IP address 2, to a timepoint at which an ACK of the initial packet is received, or a time elapsed from a timepoint at which a ping request signal of ICMP is transmitted to a timepoint at which a ping ACK is received.

According to various example embodiments, the identifying an RTT may include: identifying a server related to an application program to be accessed through IP address 2 through domain name system (DNS) pre-resolving, based on identification of IP address 2, and identifying the RTT in which IP address 2 is used through the server related to the application program to be accessed through IP address 2.

According to various example embodiments, the switching the data path to IP address 2 may include switching the data path to IP address 2 based on, prior to expiration of the valid lifetime of IP address 1, the difference between the RTT in which IP address 2 is used and the RTT in which IP address 1 being used is equal to orless than a designated reference value.

According to various example embodiments, the method for operating an electronic device may include maintaining the data path of IP address 1 based on the difference between the RTT in which IP address 2 is used and the RTT in which IP address 1 is used exceeding the designated reference value.

According to various example embodiments, the method for operating an electronic device may include repeatedly determining whether to switch the data path to IP address 2, based on the RTT in which IP address 1 is used and the RTT in which IP address 2 is used, based on a designated period, based on the data path of IP address 1 being maintained prior to expiration of the valid lifetime of IP address 1, and switching the data path to IP address 2 based on the number of times whether to switch the data path to IP address 2 is determined exceeding a designated number of times.

According to various example embodiments, the releasing IP address 1 may include: reducing the valid lifetime of IP address 1 based on modification of the data path to IP address 2, and releasing IP address 1 based on expiration of the reduced valid lifetime of IP address 1.

According to various example embodiments, a method for operating an electronic device (for example, the electronic device 101 in FIG. 1, FIG. 2, FIG. 3, FIG. 4, or FIG. 5) may include performing data communication through PDU session 1 and IP address 1. According to an example embodiment, the method for operating an electronic device may include identifying PDU session 2 and IP address 2 related to modification of a PDU session. According to an example embodiment, the method for operating an electronic device may include identifying an RTT related to PDU session 1 and an RTT related to PDU session 2 in a state in which PDU session 1 and related to PDU session 2 are allocated. According to an example embodiment, the method for operating an electronic device may include modifying the data path to PDU session 2, based on a result of comparing the RTT related to PDU session 1 and the RTT related to PDU session 2, prior to expiration of a valid lifetime of PDU session 1. According to an example embodiment, the method for operating an electronic device may include releasing PDU session 1 based on modification of the data path to PDU session 2.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   communication circuitry;
   at least one processor including processing circuitry; and
   memory storing instructions,
   wherein the instructions, when executed by the at least one processor, individually and/or collectively, cause the electronic device to:
   establish a protocol data unit (PDU) session;
   perform data communication through a first data path corresponding to & Internet protocol (IP) address 1 allocated to the PDU session by a network;

identify IP address 2 allocated to the PDU session by the network, the IP address 2 being different from the IP address 1;

identify a round trip time 1 (RTT 1) in which the IP address 1 is used and an RTT 2 in which the IP address 2 is used, in a state in which the IP address 1 and the IP address 2 are allocated to the PDU session;

switch from the first data path to a second data path corresponding to the IP address 2, based on a difference between the RTT 2 and the RTT 1 being equal to or less than a designated reference value, prior to expiration of a valid lifetime of the IP address 1;

reduce, in response to switching to the second data path, the valid lifetime of the IP address 1 using a designated interval; and release the IP address 1 based on expiration of the reduced valid lifetime of the IP address 1.

2. The electronic device of claim 1, wherein the instructions, when executed by the at least one processor, individually and/or collectively, cause the electronic device to:

transmit a message related to an access request to the network through the communication circuit; and establish, based on information related to session and service continuity (SSC) mode 3 included in information related to PDU establishment acceptance received from the network through the communication circuit, the PDU session being configured in the SSC mode 3.

3. The electronic device of claim 1, wherein the instructions, when executed by the at least one processor, individually and/or collectively, cause the electronic device to identify the RTT 1 in which the IP address 1 is used and the RTT 2 in which the IP address 2 is used through a server related to a reference application program among multiple application programs currently executed in the electronic device.

4. The electronic device of claim 1, wherein the instructions, when executed by the at least one processor, individually and/or collectively, cause the electronic device to identify the RTT 1 in which the IP address 1 is used and the RTT 2 in which the IP address 2 is used through at least one server related to each of multiple application programs currently executed in the electronic device.

5. The electronic device of claim 1, wherein the instructions, when executed by the at least one processor, individually and/or collectively, cause the electronic device to:

identify a server related to an application program to be accessed through the IP address 2 through domain name system (DNS) pre-resolving, based on identification of the IP address 2; and identify the RTT 2 in which the IP address 2 is used through the server related to the application program to be accessed through the IP address 2.

6. The electronic device of claim 1, wherein the instructions, when executed by the at least one processor, individually and/or collectively, cause the electronic device to maintain the first data path corresponding to the IP address 1 based on the difference between the RTT 2 in which the IP address 2 is used and the RTT 1 in which the IP address 1 is used exceeding the designated reference value.

7. The electronic device of claim 6, wherein the instructions, when executed by the at least one processor, individually and/or collectively, cause the electronic device to:

while maintaining the first data path corresponding to the IP address 1, repeatedly determine, based on a difference between the RTT 2 in which the IP address 2 is used and the RTT 1 in which the IP address 1 is used, whether to switch to the second data path corresponding to the IP address 2 the valid lifetime of the IP address 1 expires.

8. A method of operating an electronic device, the method comprising:

establishing a protocol data unit (PDU) session;

performing data communication through a first data path corresponding to Internet protocol (IP) address 1 allocated to the PDU session by a network;

identifying IP address 2 allocated to the PDU session by the network, the IP address 2 being different from the IP address 1;

identifying a round trip time 1 (RTT 1) in which the IP address 1 is used and an RTT 2 in which the IP address 2 is used, in a state in which the IP address 1 and the IP address 2 are allocated to the PDU session;

switching from the first data path to a second data path corresponding to the IP address 2, based on a difference between the RTT 2 and the RTT 1 being equal to or less than a designated reference value, prior to expiration of a valid lifetime of the IP address 1;

reducing, in response to switching to the second data path, the valid lifetime of the IP address 1 using a designated interval; and releasing the IP address 1 based on expiration of the reduced valid lifetime of the IP address 1.

9. The method of claim 8, wherein the establishing the PDU session comprises:

transmitting a message related to an access request to a network; and establishing, based on information related to session and service continuity (SSC) mode 3 included in information related to PDU establishment acceptance received from the network, the PDU session configured in the SSC mode 3.

10. The method of claim 8, wherein the identifying of an RTT comprises identifying the RTT 1 in which the IP address 1 is used and the RTT 2 in which the IP address 2 is used through a server related to a reference application program among multiple application programs currently executed in the electronic device.

11. The method of claim 8, wherein the identifying of an RTT comprises identifying the RTT 1 in which the IP address 1 is used and the RTT 2 in which the IP address 2 is used through at least one server related to each of multiple application programs currently executed in the electronic device.

12. The method of claim 8, wherein the identifying of an RTT comprises:

identifying a server related to an application program to be accessed through the IP address 2 through domain name system (DNS) pre-resolving, based on identification of the IP address 2; and identifying the RTT 2 in which the IP address 2 is used through the server related to the application program to be accessed through the IP address 2.

13. The method of claim 8, further comprising:

maintaining the first data path corresponding to the IP address 1 of 0 based on the difference between the RTT 2 in which the IP address 2 is used and the RTT 1 in which the IP address 1 is used exceeding the designated reference value.

14. The method of claim 13, further comprising:

while maintaining the first data path corresponding to the IP address 1, repeatedly determining, based on a difference between the RTT 2 in which the IP address 2 is used and the RTT 1 in which the IP address 1 is used, whether to switch to the second data path corresponding to the IP address 2, until the valid lifetime of the IP address 1 expires.

\* \* \* \* \*